United States Patent
Cracco et al.

(10) Patent No.: US 9,446,816 B2
(45) Date of Patent: Sep. 20, 2016

(54) BICYCLE ELECTRONIC SYSTEM

(71) Applicant: CAMPAGNOLO S.r.L., Vicenza (IT)

(72) Inventors: Flavio Cracco, Vicenza (IT); Gianluca Bortolozzo, Cavarzere (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 14/290,681

(22) Filed: May 29, 2014

(65) Prior Publication Data

US 2014/0358386 A1 Dec. 4, 2014

(30) Foreign Application Priority Data

May 31, 2013 (IT) .............................. MI2013A0895
Nov. 21, 2013 (IT) .............................. MI2013A1942

(51) Int. Cl.
- *B62M 9/122* (2010.01)
- *B62M 9/132* (2010.01)
- *B62M 25/08* (2006.01)

(52) U.S. Cl.
CPC ............. *B62M 9/122* (2013.01); *B62M 9/132* (2013.01); *B62M 25/08* (2013.01)

(58) Field of Classification Search
None
See application file for complete search history.

(56) References Cited

U.S. PATENT DOCUMENTS

| | | | |
|---|---|---|---|
| 5,213,548 A | 5/1993 | Colbert et al. | |
| 6,741,045 B2 | 5/2004 | Kitamura | |
| 6,757,567 B2 | 6/2004 | Campagnolo | |
| 8,402,664 B1 | 3/2013 | Kitamura et al. | |
| 2005/0187049 A1* | 8/2005 | Guderzo | B62M 25/08 474/70 |
| 2005/0195094 A1 | 9/2005 | White | |
| 2008/0312799 A1* | 12/2008 | Miglioranza | B62M 9/122 701/66 |
| 2011/0267178 A1 | 11/2011 | Nishihara et al. | |
| 2012/0053804 A1 | 3/2012 | Saida et al. | |
| 2012/0159328 A1 | 6/2012 | Millington et al. | |
| 2012/0252544 A1 | 10/2012 | Yuen | |
| 2013/0027052 A1 | 1/2013 | Matsumoto | |
| 2013/0030603 A1 | 1/2013 | Hashimoto et al. | |
| 2013/0061705 A1* | 3/2013 | Jordan | B62M 25/08 74/473.13 |
| 2014/0277637 A1 | 9/2014 | Ventura et al. | |

FOREIGN PATENT DOCUMENTS

| | | |
|---|---|---|
| EP | 2042416 A1 | 4/2009 |
| EP | 2399813 A1 | 12/2011 |
| EP | 2072091 B1 | 2/2012 |
| WO | 2010131983 A1 | 11/2010 |
| WO | 2011026137 A1 | 3/2011 |
| WO | 2011/039723 A1 | 4/2011 |

OTHER PUBLICATIONS

Non-Final Office Action issued by the USPTO in counterpart U.S. Appl. No. 14/290,646 on Jun. 11, 2015.
Non-Final Office Action dated Dec. 4, 2015, issued in related U.S. Appl. No. 14/290,734.
Office Action for European Application No. 14 151 908.2, dated May 10, 2016.

* cited by examiner

*Primary Examiner* — Edwin A Young
(74) *Attorney, Agent, or Firm* — Volpe and Koenig, P.C.

(57) ABSTRACT

A bicycle electronic system including: a manual command management unit, having a casing configured for being fixed at a handgrip of a bicycle handlebar, that includes at least one first manually actuatable switch and a first processor; a derailleur management unit comprising a second processor; and, a first direct communication channel that connects the first processor and the second processor. In response to the manual actuation of the at least one first switch, the first processor emits a derailleur command signal addressed to the derailleur management unit, and the second processor receives the derailleur command signal from the first processor through the first direct communication channel.

9 Claims, 13 Drawing Sheets

BICYCLE ELECTRONIC SYSTEM

CROSS REFERENCE TO RELATED APPLICATION

This application claims the benefit of Italian Application Nos. MI2013A000895, filed on May 31, 2013 and MI2013A001942, filed Nov. 21, 2013, the entire contents of all of which are incorporated herein by reference as if fully set forth.

FIELD OF THE INVENTION

The present invention relates to a bicycle electronic system and in particular a bicycle electronic gearshift.

BACKGROUND

A motion transmission system in a bicycle comprises a chain extending between toothed wheels associated with the axle of the pedal cranks and with the hub of the rear wheel. When there is more than one toothed wheel at at least one of the axle of the pedal cranks and the hub of the rear wheel, and the motion transmission system is therefore provided with a gearshift, a front derailleur and/or a rear derailleur are provided for. In the case of an electronically servo-assisted gearshift, each derailleur comprises a chain guide element, also known as cage, movable to move the chain among the toothed wheels in order to change the gear ratio, and an electromechanical actuator to move the chain guide element. The actuator in turn typically comprises a motor, typically an electric motor, coupled with the chain guide element through a linkage such as an articulated parallelogram, a rack system or a worm screw system, as well as a sensor of the position, speed and/or acceleration of the rotor or of any moving part downstream of the rotor, down to the chain guide element itself. It is worthwhile noting that slightly different terminology from that used in this context is also in use.

Control electronics changes the gear ratio automatically, for example based on one or more detected variables, such as the travel speed, the cadence of rotation of the pedal cranks, the torque applied to the pedal cranks, the slope of the travel terrain, the heart rate of the cyclist and similar, and/or, of particular interest for the present invention, the gear ratio is changed based on commands manually input by the cyclist through suitable control members, for example levers and/or buttons.

A device for controlling the front derailleur and a device for controlling the rear derailleur—or just one of the two in the case of simpler gearshifts—are mounted so as to be easy for the cyclist to manoeuvre, normally on the handlebars, close to the handgrips thereof where the brake lever is also located for controlling the front and rear wheel brake, respectively. Control devices that allow to drive both a derailleur in the two directions and a brake are commonly called integrated controls.

By convention, the device for controlling the front derailleur and the brake lever of the front wheel are located close to the left handgrip, and the device for controlling the rear derailleur and the brake lever of the rear wheel are located close to the right handgrip.

The aforementioned components are located on-board the bicycle and must communicate with one another. Moreover, the aforementioned components must be powered.

U.S. Pat. No. 6,741,045 B2 discloses a bicycle control apparatus comprising a bicycle component control unit having one of a control transmitter and a control receiver; a computer control unit having the other one of the control transmitter and the control receiver; a transmission path coupled to the bicycle component control unit and to the computer control unit; wherein the control transmitter communicates power and data to the control receiver on the transmission path. The document generally indicates that the transmission path between display-carrier unit and front derailleur unit can also be wireless, however it does not indeed teach to transmit power in a wireless manner.

U.S. Pat. No. 6,757,567 B2 discloses an electronic control system for cycles for association with a set of sensors, a set of actuators and a set of control members associated with the cycle, comprising: a first processor unit able to act as a unit for processing and displaying information, that in the embodiment shown is a display unit; a second processor unit able to act as a unit for controlling the communication and interfacing with said set of control members, that in the embodiment shown is a display-carrier unit; and a third processor unit able to act as a unit for interfacing with said set of sensors and said set of actuators, that in the embodiment shown is a central unit arranged at the bottle-holder; said first, second and third processor unit being connected together via asynchronous bi-directional communication channels.

EP 2 072 091 B1 discloses a bicycle electronic apparatus comprising an electronic control unit, a display unit, a drive unit and a second electronic control unit or sensor unit that communicate via a communication channel through a suitable communication protocol; a line for powering the components of the bicycle electronic apparatus is also provided. The electronic control unit in the embodiment shown is housed in the casing of a display unit. The document generally indicates that the communication between the various units can also be wireless.

The Applicant has perceived that the architectures of the aforementioned documents generally comprise a main processor, the malfunctioning of which results in the entire system malfunctioning.

The problem at the basis of the invention is therefore that of avoiding the aforementioned drawbacks, in particular providing a bicycle electronic system having a distributed architecture.

SUMMARY

In one aspect thereof, the present invention relates to a bicycle electronic system, comprising:
- a manual command management unit having a casing configured for being fixed at a handgrip of a bicycle handlebar, comprising at least one first manually actuatable switch and a first processor,
- a derailleur management unit comprising a second processor,
- characterized in that the system comprises a first direct communication channel between the first processor and the second processor, and wherein the first processor, in response to the manual actuation of the at least one first switch, emits a derailleur command signal addressed to the derailleur management unit, and the second processor receives the derailleur command signal from the first processor through the direct communication channel.

In the present description and in the attached claims under the term "channel", a communication or propagation route of a signal is meant. From the physical point of view the term "channel" is used to indicate the type of wired media that connect two units for the physical remote transmission of the information committed to the signals or the physical environment (radio medium) wherein these propagate.

Therefore, in such a way, it is possible to avoid a centralised unit that receives the commands emitted by the manual command management unit and routes them—possibly re-processing them—towards the derailleur management unit.

Since the casing of the manual command management unit is configured for being fixed at a handgrip, a manual command management unit according to the invention does not include a display-carrier unit, a display unit or another centralised unit of the type used up to now, i.a., for grouping the commands emitted with two manual command management units where present.

Preferably the system comprises a second manual command management unit having a casing configured for being fixed at a second handgrip of a bicycle handlebar, comprising at least one second manually actuatable switch and a third processor.

Preferably the system comprises a second derailleur management unit comprising a fourth processor.

Preferably the system comprises a second direct communication channel between the third processor and the fourth processor, and the third processor, in response to the manual actuation of the at least one second switch, emits a derailleur command signal addressed to the second derailleur management unit, and the fourth processor receives the derailleur command signal from the third processor through the second direct communication channel.

Preferably the system, also in the absence of the second manual command management unit, comprises a third direct communication channel between the first processor and the fourth processor, and the first processor, in response to the manual actuation of the at least one first switch, emits a derailleur command signal addressed to the second derailleur management unit, and the fourth processor receives the derailleur command signal from the first processor through the third direct communication channel.

Preferably, also in the absence of the second derailleur management unit, the system comprises a fourth direct communication channel between the third processor and the second processor, and the third processor, in response to the manual actuation of the at least one second switch, emits a derailleur command signal addressed to the derailleur management unit, and the second processor receives the derailleur command signal from the third processor through the fourth direct communication channel.

Preferably, the first manual command management unit and the second manual command management unit, if provided for, have at least two switches.

In embodiments, those provided for among the first direct communication channel and/or the second direct communication channel and/or the third direct communication channel and/or the fourth direct communication channel are wireless communication channels.

In embodiments, those provided for among the first direct communication channel and/or the second direct communication channel and/or the third direct communication channel and/or the fourth direct communication channel are cabled communication channels.

Preferably, those provided for among the first direct communication channel and/or the second direct communication channel and/or the third direct communication channel and/or the fourth direct communication channel are cabled communication channels on a same communication bus.

In one aspect thereof, the present invention relates to a bicycle electronic system, wherein the distributed architecture is embodied in a wired mode, comprising:
a battery unit,
a manual command management unit,
a derailleur management unit, and
a supply and communication bus, each of said units being connected to said bus.

Each of said manual command management unit and derailleur management unit comprises a processor and a voltage regulator arranged between the processor and said bus.

Such a distributed architecture makes it possible to avoid a central processing unit, as well as to easily expand the system. Moreover, the power supply is advantageously shared by all of the units, each advantageously being provided with a voltage regulator to adapt it to its processor that can therefore be specific for the unit itself. The manual command management unit directly communicates with the derailleur management unit through the bus to impart gear-shifting commands thereto. Vice-versa, the derailleur management unit can communicate messages relative to its own state directly to the manual command management unit.

This embodiment of the bicycle electronic system can be further improved through the following additional features capable to be combined with each other as desired.

Advantageously, said supply and communication bus comprises a ground cable, a power supply cable and a single serial communication cable.

By providing for a bus with three wires distributed over the entire system, the connections of the various units are simplified.

Preferably, each of said manual command management unit and derailleur management unit comprises a receiver incorporated within said processor or external thereto and/or a transmitter.

By providing for both the transmitter and the receiver on each unit, the capabilities of the system are increased.

Preferably, said transmitter and said receiver are connected to said serial communication cable.

Preferably, each of said manual command management unit and derailleur management unit further comprises a capacitive device arranged between the regulator and power supply and ground cables of said bus.

Said capacitive device advantageously has the function of allowing the power supply to the processor for a brief time sufficient for saving data in the case of a lack of power supply.

Preferably, each of said manual command management unit and derailleur management unit and optionally said battery unit comprises a polarizer, preferably a resistor, arranged between power supply and communication cables of said bus.

Advantageously, the system further comprises a second manual command management unit and a second derailleur management unit, each comprising a processor and a voltage regulator arranged between the processor and ground and power supply cables of said bus.

Advantageously, the system further comprises at least one other unit selected from the group consisting of a computer cycle, a sensor unit, a logging unit, a peripheral unit, each comprising a processor and a voltage regulator arranged between the processor and ground and power supply cables of said bus.

Preferably, said transmitter comprises a MOSFET and a resistor connected in series between the communication and ground cables of the bus, the gate of the MOSFET being driven by the processor.

Preferably, the receiver comprises a threshold comparator, more preferably a Schmitt trigger.

Preferably, the processor is configured to check, through the receiver, that the voltage on the communication cable is equal to a quiescence value for a minimum time and transmit a message, through the transmitter, only in the affirmative case.

Preferably, the processor is configured to check, through the receiver, every bit transmitted through the transmitter and to retransmit the entire message and/or the single transmitted bit in case the check gives a negative outcome.

Preferably, the processor is configured to monitor, through the receiver, whether the voltage on the communication cable is equal to a quiescence value for a minimum time and, in the negative case, to receive a message, to check whether it is the addressee unit, and, in the positive case, to send an acknowledgement of receipt signal through the transmitter, to carry out a possible action in response to the message, and to send a further acknowledgement of receipt signal through the transmitter.

In one aspect thereof, the present invention relates to a bicycle electronic system, wherein the distributed architecture is embodied in an at least partially wireless mode.

Such a bicycle electronic system exploits wireless connectivity in an optimized manner.

In one aspect thereof, the present invention thus concerns a bicycle electronic system comprising a first manual command management unit having a casing configured for being fixed at a handgrip of a bicycle handlebar, comprising at least one first manually actuatable switch, a first processor and a first wireless communication device.

The first manual command management unit further comprises a circuit for supplying power to the first processor and the first wireless communication device, the power supply circuit comprising a battery power supply source and/or being configured for absorbing energy from a radiofrequency electromagnetic field generated within the system.

Through the aforementioned characteristics, the manual command management unit is totally free of electric wires coming out from its casing and directed to one or more other components of the system, with manifest advantages such as for example an improved appearance, improved aerodynamics and a particular assembly easiness. It should be understood that there could be a mechanical cable for actuating a brake, such as a Bowden cable, in the case of a so-called integrated command that is suitable for commanding not only an electronic gearshift, but also a mechanical brake.

Preferably, the battery power supply source where provided for is a battery of the button cell type.

Preferably, the battery power supply source is a battery of the alkaline type.

Preferably, the system further comprises at least one first derailleur unit.

Preferably in the manual command management unit, the first processor, in response to the manual actuation of the at least one first switch, emits a derailleur command; and the derailleur management unit receives and processes the derailleur command.

As specified more clearly hereinafter, the communication of the derailleur command from the manual command management unit to the derailleur management unit can be direct or indirect, through another unit of the system named interface unit herein.

Preferably, the system further comprises at least two units preselected among a first derailleur unit, a second derailleur unit, and a battery unit, and at least one electric cable connection between said at least two preselected units.

Preferably said at least one electric cable connection comprises a power supply connection.

Preferably said at least one electric cable connection further comprises a data and/or command communication connection.

The system therefore preferably and advantageously has an innovative mixed architecture, wherein the "top" part of the bicycle—that is to say the manual control(s) that is(are) fixed to the handlebar and possibly a display unit or interface unit (interface between the manual controls and the rest of the system and/or interface with the user)—are totally wireless (communication and power supply), while the "bottom" part of the bicycle, comprising the derailleurs, is connected via cable. This architecture is optimized since in the bottom part of the bicycle the powers involved are greater, having to provide for the movement of at least one chain guide. Moreover, in such a "bottom" part of the bicycle the presence of cables is typically less critical since it is easier to pass them inside the frame, due to the fact that the tubes of the frame have a greater section than the tubes of the handlebar, and they have a different shape.

The interface unit can be totally wireless or be connected via cable with the "bottom" part of the bicycle.

The data and/or command communication can be totally wireless within the system, providing a wireless communication also between said at least two preselected units, or it can be mixed, when as mentioned said at least one electric cable connection comprises a data and/or command communication connection. In latter case, the electric cables provided for the power supply connection are exploited for providing a cabled communication, which is for some aspects more reliable and faster than wireless communication.

Preferably the system comprises a first derailleur unit, a second derailleur unit and a battery unit, a first electric cable connection between the battery unit and the first derailleur unit, and a second electric cable connection between the battery unit and the second derailleur unit.

In embodiments, the first and the second electric cable connection comprise power supply connections, the system further comprising at least one data and/or command wireless communication channel between said first derailleur unit, second derailleur unit and battery unit.

In embodiments, the first and the second electric cable connection comprise power supply and data and/or commands communication connections.

The battery unit, where present, can be housed in the seat post or in the seat tube, or fixed outside the frame in a suitable position.

In other embodiments, at least one of the first and second derailleur unit comprises a battery, and the battery unit is absent.

Preferably, the system comprises a second manual command management unit having a casing configured for being fixed at a second handgrip of a bicycle handlebar, comprising at least one second manually actuatable switch, a second processor and a second wireless communication device, wherein the second manual command management unit further comprises a second circuit for supplying power to the second processor and the second wireless communication device, the second power supply circuit comprising a battery power supply source and/or being configured for absorbing energy from a radiofrequency electromagnetic field generated within the system.

In embodiments, the system further comprises an interface unit between the first manual command management unit and the rest of the system, in particular between the first manual command management unit and the second manual command management unit and one or two derailleur management units.

Preferably, the interface unit comprises a third processor and a third wireless communication device, as well as a third circuit for supplying power to the third processor and of the third wireless communication device.

Preferably, the third power supply circuit comprises a battery power supply source configured for supplying energy also to said radiofrequency electromagnetic field generated within the system.

As an alternative, the interface unit absorbs energy from a radiofrequency electromagnetic field generated within the system.

As an alternative, the interface unit is connected with the battery unit though a power supply, and optionally also data/command communication, connection.

Preferably, when the first manual command management unit comprises the power supply circuit configured only for absorbing energy from a radiofrequency electromagnetic field, it further comprises an energy accumulation device, typically a condenser.

This preferably holds true also for the second manual command management unit, where provided for, and/or for the interface unit, if supplied by a radiofrequency electromagnetic field generated within the battery unit.

Through such an energy accumulation device, the manual command management unit (or other unit) is capable of self-powering its processor for a length of time that is sufficient for transmitting a request for emission of radiofrequency electromagnetic field to another component of the system.

Preferably the first wireless communication device comprises a reception and transmission antenna.

Preferably the reception and transmission antenna is made as a track of a board for printed circuit board (PCB) carrying the first processor.

This preferably holds true also for the second manual command management unit and/or for the interface unit and/or for other units, where provided for and provided with a reception and transmission antenna.

Advantageously, the provision of such an antenna incorporated in the PCB avoids the necessity of having to provide, keep in store and assemble a distinct component.

Preferably the units of the system on board of a same bicycle are so configured as to make a private communication network, and more preferably that is secured with respect to the outside.

This provision allows the coexistence of said communication network on board of a first bicycle with a similar communication network on board of a second bicycle, without interferences in the passage of data and/or commands between the two networks. This is particularly important during races and in particular during sprinting, in which there can be tens of bicycles in a range of a few metres.

The units of the system on board of a same bicycle can be connected in a communication network of the mesh type (mesh network), wherein each unit represents a node that acts as a receiver, transmitter and/or repeater, or in a communication network having at least one star subnetwork wherein one unit represents a node that acts as a star centre node and other units represent a peripheral node, or in a communication network having at least one tree subnetwork wherein a unit represents a node that acts as a root and other units represent a peripheral node.

Each root node or star centre node has the function of receiver and/or transmitter and/or repeater and/or network coordinator.

Each peripheral node has the function of receiver and/or transmitter, but not of repeater and/or network coordinator.

Preferably the wireless communication is carried out in accordance with a low power wireless communication protocol selected from the group consisting of ZigBee, Blue tooth, Blue Tooth Low Power consumption, NFC, WiFi, RFID, more preferably in accordance with the protocol known as ZigBee.

More specifically, ZigBee is the name of a specification for a group of high level communication protocols that use small low power digital antennas, based on the standard IEEE 802.15.4 for wireless Personal area networks (WPAN).

Preferably the wireless communication occurs at 868 MHz or 2.4 GHz.

The security of the network can be embodied by means of suitable, per se well known, cryptographic systems. Purely as an example, the possibility of adding a CRC (Cyclic Redundancy Check) at the end of a message, which acts as a read keyword, and/or the possibility of inverting the communication bit shall be mentioned.

Preferably the communication network among the units of the system on board of a same bicycle is configured to be further in wireless communication with a supervisor device that is not mounted on board of the bicycle.

Advantageously such a supervisor device is on board of a so called team car, which follows a bicycle or a team of bicycles during a race.

Through wireless communication, the current value of one or more parameters and/or variables of the systems on board of one or more bicycles can be advantageously transmitted to the supervisor device and/or the value of one or more parameters and variables of the systems on board of one or more bicycles can be modified by the supervisor device, with a direct communication from the supervisor device to the system on board of a bicycle and/or with a broadcast communication from the supervisor device addressed to all the systems on board of the bicycles of the team.

In one aspect thereof, the invention concerns a control system of at least one bicycle comprising a bicycle electronic system as mentioned above and a supervisor device not on board of the bicycle in wireless communication with one another.

In one aspect thereof, the invention concerns a control device for a bicycle electronic system as mentioned above.

In one aspect thereof, the invention concerns a bicycle electronic system comprising at least two wireless communication units in wireless communication through ZigBee protocol.

In one aspect thereof, the invention concerns a bicycle electronic system comprising a unit comprising a processor and a wireless communication antenna, wherein the wireless communication antenna is made as a track of a printed circuit board (PCB) carrying the processor.

In one aspect thereof, the invention concerns a bicycle electronic system comprising a manual command management unit comprising a power supply circuit configured for absorbing energy from a radiofrequency electromagnetic field, and an energy accumulation device, typically a condenser.

Through such an energy accumulation device, the manual command management unit is capable of self-powering its own processor for a length of time that is sufficient for transmitting a request for emission of radiofrequency electromagnetic field to another component of the system.

The systems and devices of such other aspects of the invention can comprise one or more of the features described above.

BRIEF DESCRIPTION OF THE DRAWINGS

Further features and advantages of the present invention will become clearer from the following detailed description of some preferred embodiments thereof, made with reference to the attached drawings. The different features in the individual configurations can be combined together as desired. In such drawings

DETAILED DESCRIPTION OF THE PREFERRED EMBODIMENTS

Figure 1:
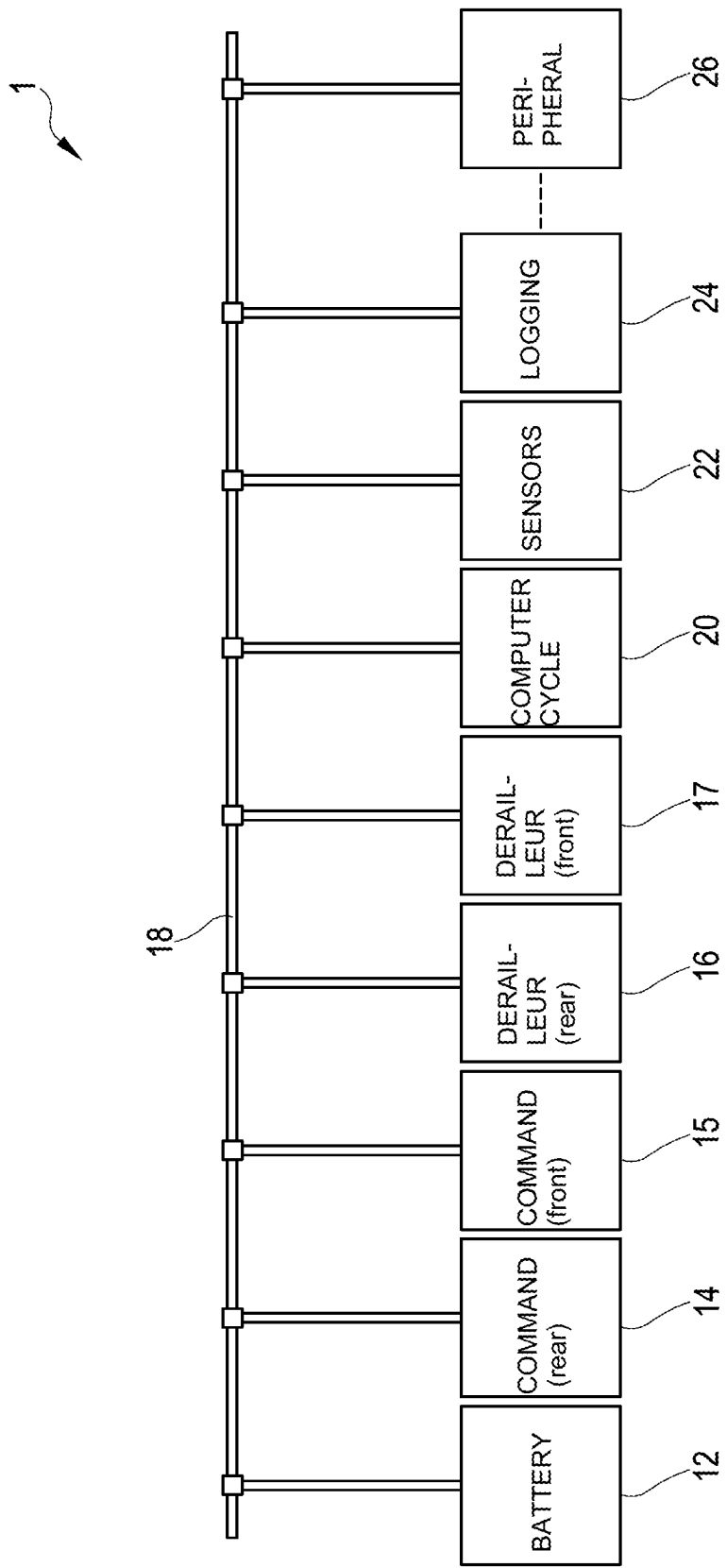
FIG. 1 is a block diagram of a bicycle electronic system according to an embodiment of the present invention.

In the following description, for the illustration of the figures, identical or similar reference numerals are used to indicate constructive elements with the same or analogous function.

With reference to FIG. 1, a bicycle electronic system 1 comprises a battery unit 12, a manual command management unit 14, a derailleur management unit 16, and a bus 18 or power supply and communication bus. Each of said units 12, 14, 16 is connected to the bus 18.

For example, the manual command management unit 14 is the one actuatable with the right hand, comprising in a per se known manner a casing that is configured for being fixed at a handgrip of a bicycle handlebar, and the derailleur management unit 16 is the one associated with the rear wheel.

Preferably, but not necessarily, the bicycle electronic system 1 further comprises other units connected to the bus 18.

A second manual command management unit 15 and a second derailleur management unit 17 are thus shown, in the above example the one actuatable with the left hand, comprising in a per se known manner a casing that is configured for being fixed at a handgrip of a bicycle handlebar, and the one associated with the axle of the pedal cranks, respectively.

In an alternative embodiment, there can be just the management unit of the front derailleur and the respective control, typically actuatable with the left hand.

Among the other units that can be connected to the bus 18 in the bicycle electronic system 1 there are a computer cycle 20, a sensor unit 22, a logging unit 24, and a generic peripheral unit 26, for example a unit for detecting/processing the pedalling effort, remotely-positioned command units, namely one or more duplicated command unit(s) in different positions on the handlebars or elsewhere, etc.

Figure 2:
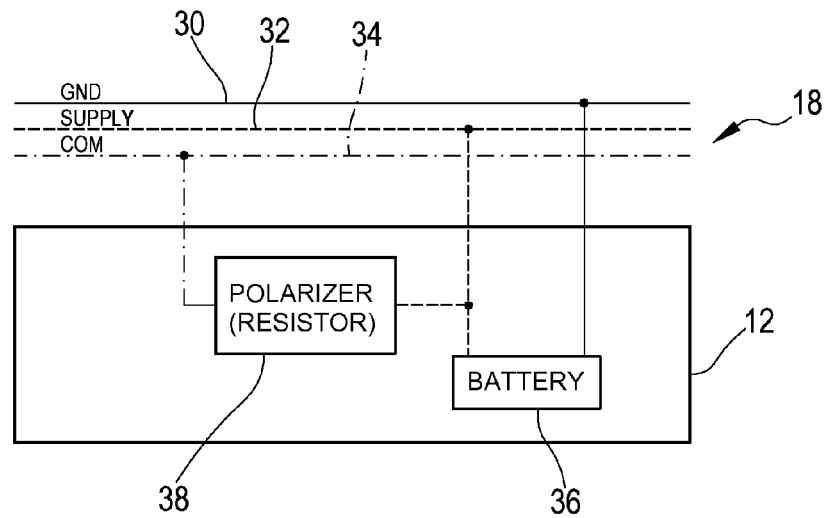
FIG. 2 is a block diagram of a battery unit of the bicycle electronic system.
Figure 3:
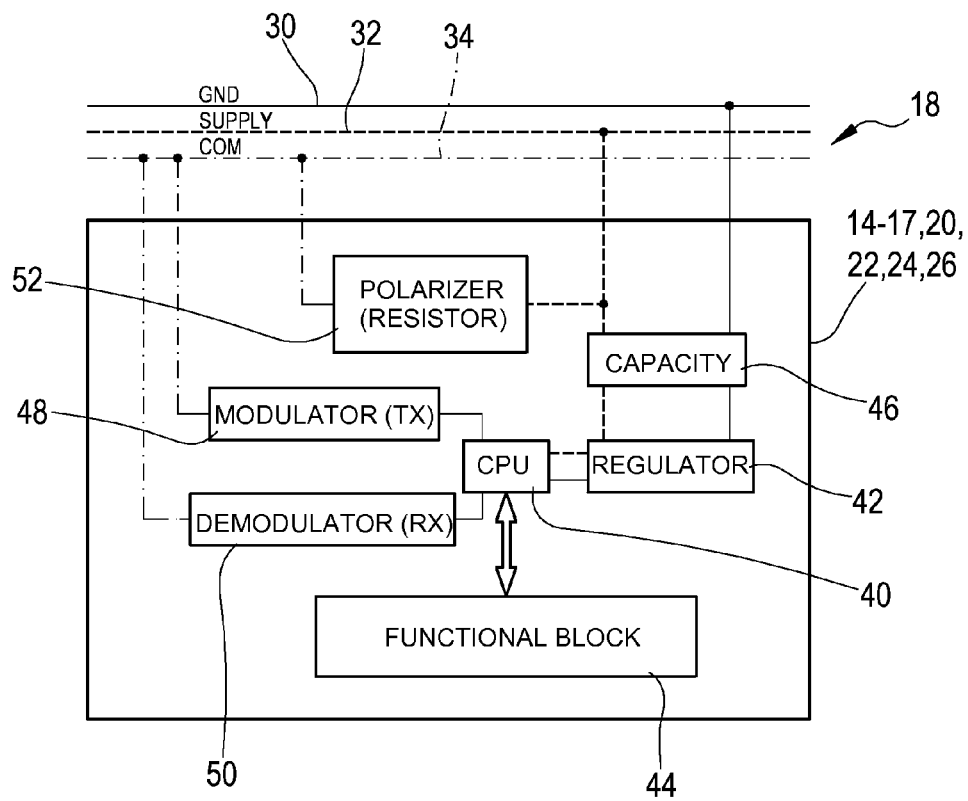
FIG. 3 is a block diagram of each of the other units of the bicycle electronic system.

The bus 18 is a physically cabled channel. The bus 18 preferably comprises three cables, as can be seen in FIGS. 2, 3: a ground cable 30, a power supply cable 32 and a single serial communication cable 34. The ground cable 30 is the reference for all the differences in electrical potential of the system, the power supply cable 32 feeds all of the units 14-17, 20, 22, 24, 26 connected in the bicycle electronic system 1, and the serial communication cable 34 is used by all of the units 14-17, 20, 22, 24, 26 connected in the bicycle electronic system 1 to communicate service or error messages or commands.

FIG. 2 also illustrates the block diagram of the battery unit 12, while FIG. 3 also shows the block diagram of each of the other aforementioned units 14-17, 20, 22, 24, 26.

The battery unit 12 comprises a power cell or battery 36 or accumulator, which can also be formed of many cells, preferably rechargeable, typically connected in series. The battery 36 is connected between the ground and power supply cables 30, 32 to supply a voltage difference between the two cables available for the rest of the bicycle electronic system 1 through the bus 18. The battery unit 12 also optionally comprises a polarizer 38, for example a resistor, connected between the power supply cable 32 and the communication cable 34 to generate a known voltage on the communication cable 34.

As shown in FIG. 3, each of the other units 14-17, 20, 22, 24, 26 comprises a processor 40 and a voltage regulator 42 arranged between the processor 40 and the bus 18, more specifically between its ground and power supply cables 30, 32.

The processor 40 controls and/or is controlled by devices specific for the unit 14-17, 20, 22, 24, 26 itself, depicted by a generic functional block 44. For example, in the case of the manual command management unit 14, 15 the functional block 44 typically comprises at least one or two switches to transmit, upon a change of their state, an upward gearshifting request signal and/or a downward gearshifting request signal, respectively, as well as possibly levers or buttons for actuating the switches; in the case of the derailleur management unit 16, 17, the functional block 44 for example comprises a driving circuit of an electric motor and/or an electric motor for moving the chain guide element of the derailleur; in the case of the computer cycle 20, the functional block 44 for example comprises a display, control switches, a data and program memory; in the case of the sensor unit 22, the functional block 44 comprises one or more sensors of variables such as the travel speed, cadence of rotation of the pedal cranks, the torque applied to the pedal cranks, the slope of the travel terrain, the heart rate of the cyclist and the like; in the case of the logging unit 24, the functional block 44 for example comprises a clock and a memory to store events and the respective times when they occurred; finally, in the case of a generic peripheral unit 26, the functional block 44 comprises one or more electronic devices controlled by or for controlling the processor 40; there could also be peripheral units 26 having just a processing function, without the functional block 44.

The provision of a voltage regulator 42 allows each unit 14-17, 20, 22, 24, 26 to be designed with the processor 40 most suitable for the specific function of the unit itself, which as can be seen from the above can be highly variable. The voltage regulator 42, indeed, takes the power supplied by the battery 12 from the bus 18 and provides the most suitable voltage values for the processor 40.

Although it has not been shown, one or more of the electronic and electromechanical devices schematised by the functional block 44 can be directly connected to the ground 30 and power supply 32 cables to be supplied by the battery unit 12 through the bus 18.

A capacitive device 46, such as a small-capacity condenser, is preferably arranged between the voltage regulator 42 and the bus 18, more specifically between its ground and power supply cables 30, 32. Such a device has the function of allowing the power supply of the processor 40 for a brief period of time, for example a few milliseconds, sufficient to allow a delayed turning off of the processor 40 in the case of a lack of power supply on the bus 18, so that the processor 40 can take care of saving all the data and the current value of all of the variables in a non-volatile memory in the case of the lack of power supply.

Each unit 14-17, 20, 22, 24, 26 also preferably and advantageously comprises a modulator of the voltage on the communication cable or transmitter 48 and a demodulator of the voltage on the communication cable or receiver 50.

As better described hereinafter, the receiver 50 is shown as a self-standing block, but it can be incorporated in the processor 40.

The provision of a transmitter or modulator 48 and of a receiver or demodulator 50 in each unit connected in the bicycle electronic system 1 allows a direct communication between the various units. In particular, the manual command management units 14, 15 and/or the sensor unit 22 can communicate directly with the derailleur management units 16, 17 to directly impart upward and downward gearshifting commands and receive state messages of the derailleurs. A communication protocol particularly suitable for the bicycle electronic system 1 is illustrated hereinafter.

In some units 14-17, 20, 22, 24, 26 the transmitter 48 and/or the receiver 50 could be absent, of course giving up the ability to communicate (or the full ability) for such units, and possibly changing communication protocol with respect to that described hereinafter.

Similarly to the battery unit 12, each of the other units 14-17, 20, 22, 24, 26 also optionally comprises a polarizer 52, for example a resistor, connected between the power supply cable 32 and the communication cable 34 to generate a known voltage on the communication cable 34.

Figure 4:
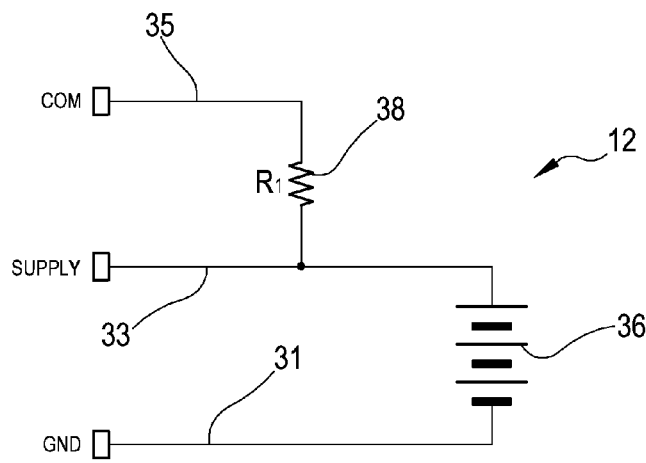
FIG. 4 is a basic wiring diagram of a battery unit of the bicycle electronic system.

FIG. 4 is a basic wiring diagram of the battery unit 12, which better illustrates how the battery 36 or accumulator, formed of plural cells connected in series, is connected between cables 31, 33 leading to the ground and power supply cables 30, 32 of the bus 18 and the optional polarizer 38, in the form of a resistor 38, is connected between cables 33, 35 leading to the power supply cable 32 and to the communication cable 34 of the bus 18.

Figure 5:
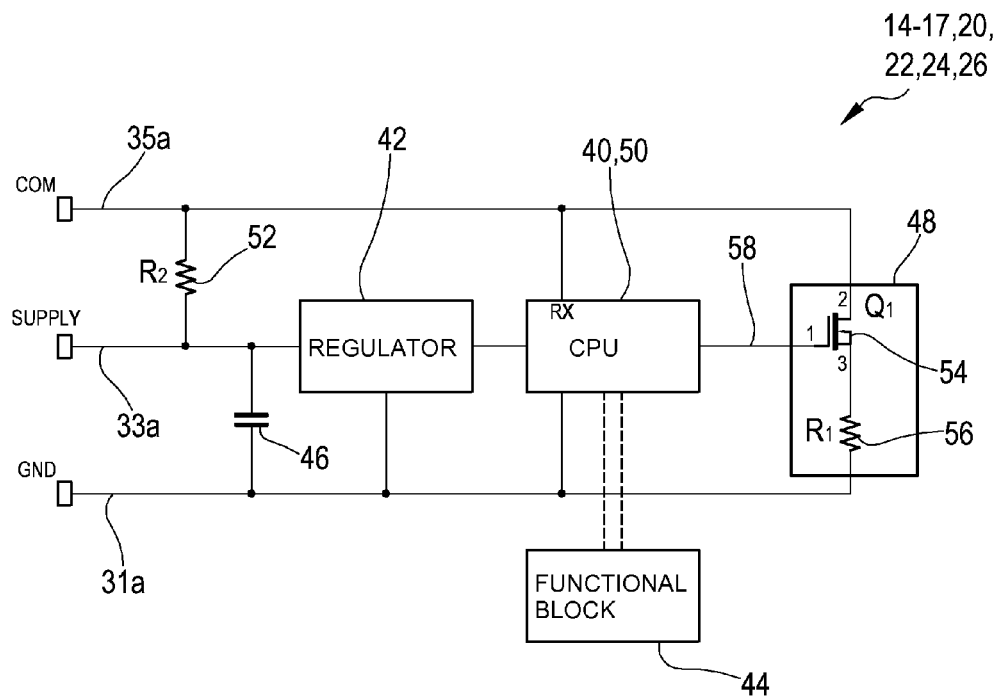
FIG. 5 is a basic wiring diagram of each of the other units of the bicycle electronic system.

FIG. 5 is a basic wiring diagram of each of the other units 14-17, 20, 22, 24, 26 of the bicycle electronic system 1. The protection capacity 46 is connected between cables 31a, 33a leading to the ground and power supply cables 30, 32 of the bus 18; downstream thereof, the voltage regulator 42 is connected between the cables 31a, 33a leading to the power supply and ground cables 32, 30 of the bus 18; the processor 40 is connected between the voltage regulator 42 and the cable 31a leading to the ground cable 30 in such a way as to be powered with a regulated voltage. The processor 40 is also connected directly to a cable 35a leading to the communication cable 34 since it incorporates or implements the receiver 50, being able to detect the voltage level present on the communication cable 34 and to interpret it according to the communication protocol described below.

In an alternative embodiment, the demodulator could be a self-standing component, for example a threshold comparator, preferably a Schmitt trigger.

The modulator or transmitter 48 comprises a MOSFET 54 and a resistor 56 connected in series between the cables 31a and 35a leading to the ground cable 30 and to the communication cable 34 of the bus 18, more specifically the drain of the MOSFET 54 is connected to the cable 35a leading to the communication cable 34, the source of the MOSFET 54 is connected to an end of the resistor 56, and a second end of the resistor 56 is connected to the cable 31a leading to the ground cable 30. The gate of the MOSFET 54 is driven by the processor 40 through a command line 58.

Finally, the polarizer 52 is shown, in the form of a resistor 52, connected between the cables 33a and 35a leading to the power supply and communication cables 32, 34 upstream of all of the devices of the unit 14-17, 20, 22, 24, 26.

When the processor 40 does not apply voltage to the gate of the MOSFET 54, the drain and the source are substantially isolated from one another and the voltage on the communication cable 34 is dictated by the polarizer 52. When the processor 40 applies a voltage to the gate of the MOSFET 54 that is greater than its threshold voltage, an electric current flows through the MOSFET 54 and there is a drop in the voltage on the communication cable 34 through the resistor 56.

The voltage Vbus on the communication cable 34 of the bus 18 then passes from a constant value called quiescence voltage Vq hereinbelow when in any unit a voltage is not applied to the gate of the MOSFET 54—voltage corresponding to a first logic level, for example to a logic 0—, to a value Vtx below Vq when in a unit a voltage is applied to the gate of the MOSFET 54—voltage corresponding to a second logic level, for example to a logic 1. The value of the voltage Vbus on the communication cable 34 of the bus is detected by the demodulator or receiver 50 and translated in a logic level 0 or 1. Through the control over time of the voltage applied to the gate of the MOSFET 54, the processor 40 through the transmitter 48 is therefore able to transmit binary signals on the communication cable 34.

It should be highlighted that some of the blocks shown in FIGS. 2, 3 and some of the components shown in FIGS. 4, 5 can be left out.

Figure 6:
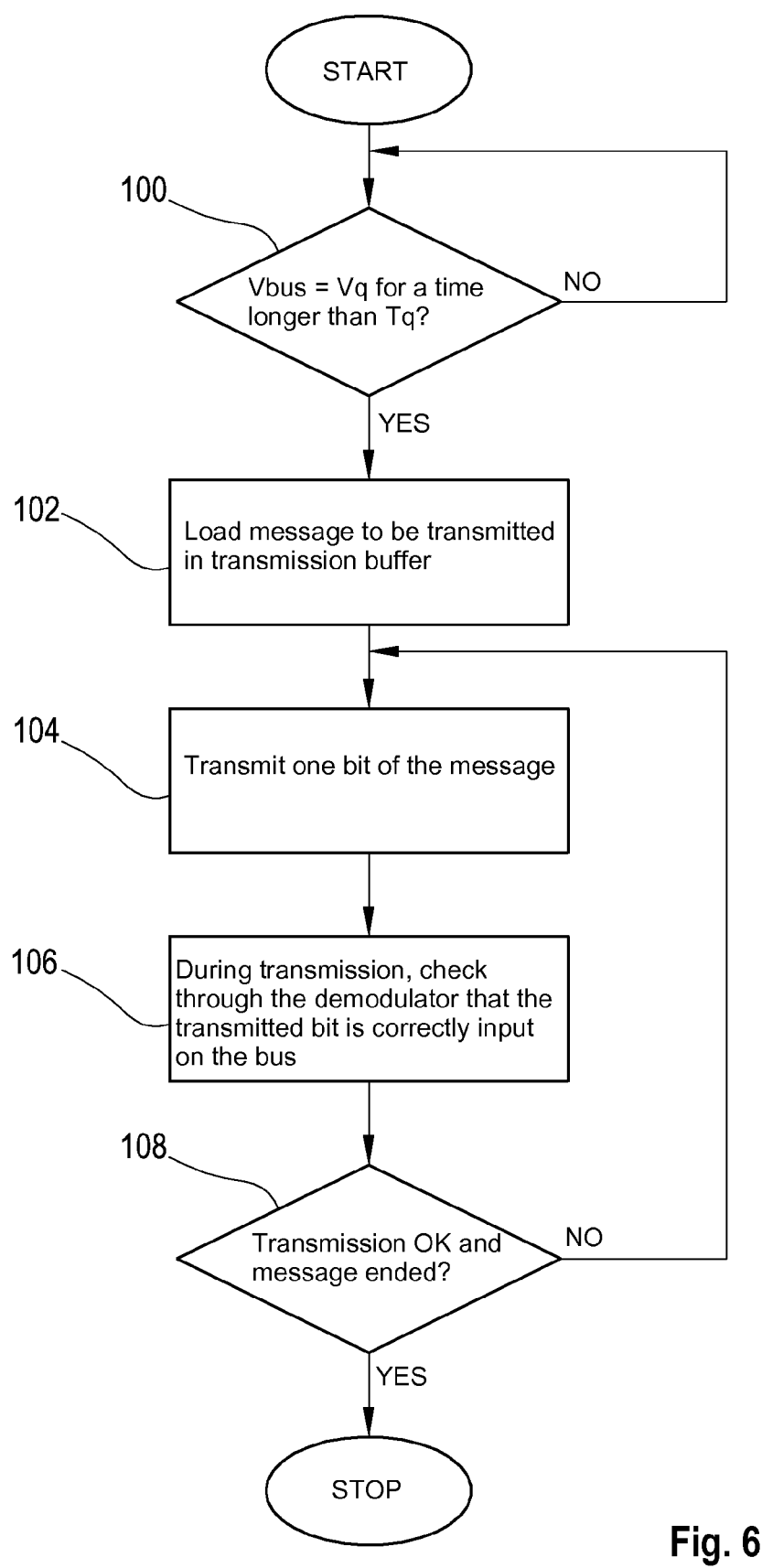
FIG. 6 is a flow chart of a communication protocol, relative to the transmission.
Figure 7:
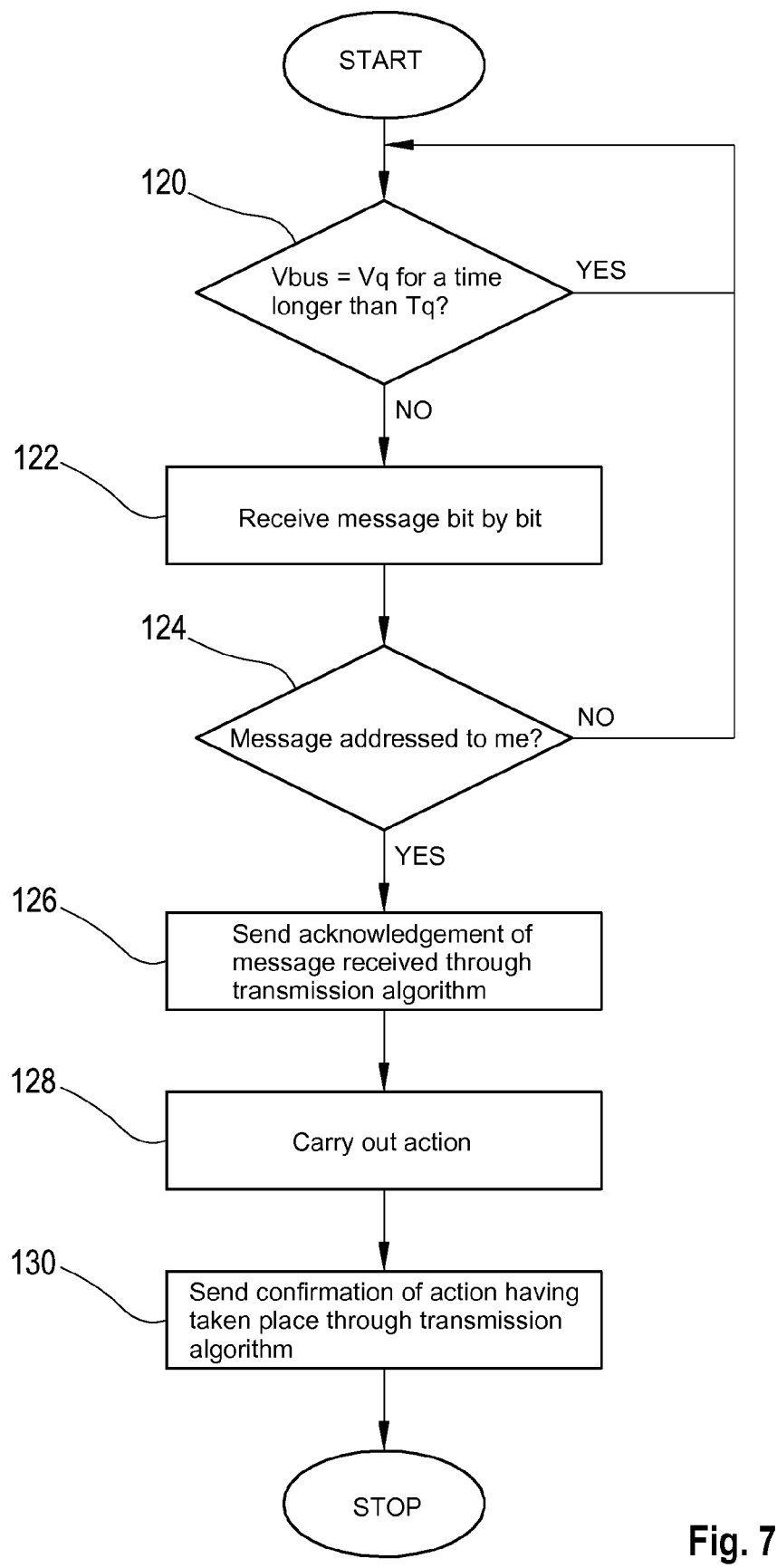
FIG. 7 is a flow chart of the communication protocol, relative to the reception.

FIG. 6 is a flow diagram of a communication protocol according to the invention, relative to transmission and FIG. 7 is a flow diagram of the communication protocol, relative to reception. The communication protocol provides that there is a single transmitting unit at a time and constant listening for reception by all of the units.

As far as transmission is concerned, with reference to FIG. 6, the processor 40 of one unit 14-17, 20, 22, 24, 26 that must transmit a message first checks, in a block 100 and through the receiver 50, that the voltage Vbus on the communication cable 34 is equal to the quiescence value Vq for a minimum time Tq, sized as average time during which on the average no device is using the bus. Tq is a minimum time that ensures that a message will not be interrupted and it can be constant, zero or variable and adapt to the modes of use.

In the negative case, i.e. if the value of the voltage Vbus has decreased to Vtx<Vq, this means that a unit 14-17, 20, 22, 24, 26 (including the unit itself that must transmit the message) already has a transmission under way, for which reason the execution stays in the checking block 100.

In the positive case, i.e. if the value of the voltage Vbus stays equal to Vq for the time period Tq, this means that no unit 14-17, 20, 22, 24, 26 is transmitting and the communication cable 34 is available.

In this case, the processor 40 loads, block 102, the message to be transmitted in a transmission buffer—although the loading can take place before the check of block 100.

The processor 40 then transmits, block 104, the message loaded in the transmission buffer one bit at a time, through the transmitter 48, and checks, block 106, through the receiver 50, that the transmitted bit is correctly loaded on the communication cable 34. In a block 108 the processor 40 checks whether the transmission of the current bit took place correctly, and whether the message to be transmitted has ended. In the negative case, it returns to block 104 to transmit another bit—or to retransmit the same bit or start again to transmit the message in the case of an error, while in the affirmative case the execution of the transmission protocol has ended.

As far as reception is concerned, with reference to FIG. 7, the processor 40 of each unit 14-17, 20, 22, 24, 26 connected in the bicycle electronic system 1 checks, in a block 120 and through the receiver 50, that the voltage Vbus on the communication cable 34 is equal to the quiescence value Vq for the minimum time Tq. So long as this condition is true, no unit 14-17, 20, 22, 24, 26 is transmitting and the processor continues to check the voltage Vbus. This check in reception can however be left out.

When the voltage Vbus is no longer equal to Vq, rather it is equal to Vtx since a unit 14-17, 20, 22, 24, 26 is transmitting, the processor 40 of each unit 14-17, 20, 22, 24, 26 connected in the bicycle electronic system 1 receives, in a block 122 and through the receiver 50, an entire message bit by bit, for example storing it in a receiving buffer.

The processor 40 of each unit 14-17, 20, 22, 24, 26 connected in the bicycle electronic system 1, in a block 124, thus checks whether the message is addressed to the unit 14-17, 20, 22, 24, 26 of which it is part, and in the negative case goes back to checking the voltage Vbus in block 120.

The processor 40 of the addressee unit of the message, in which the check of block 124 has had a positive outcome, transmits, in a block 126, an acknowledgment of message received, through the aforementioned protocol—or through a modified protocol in which it does not wait in block 100 for the bus to be free.

The processor 40 of the addressee unit of the message, in a block 128, optionally carries out an action in response to the message received. For example, in the case of an upward gearshifting request message from the manual command management unit 14, the associated derailleur management unit 16 carries out the upward gearshifting by suitably driving the electric motor for moving the chain guide element of the derailleur.

Thereafter, the processor 40 of the addressee unit of the message transmits, in a block 130, a confirmation of action having taken place, through the aforementioned protocol.

The bicycle electronic system 1 described above has a distributed architecture, wherein a central processing unit is advantageously absent. All of the units 14-17, 20, 22, 24, 26 are at the same level, none is slave or master of others. The bicycle electronic system 1 described above can easily be reconfigured with the addition, the removal or the replacement of units. The provision of a bus 18 having three cables for the entire bicycle electronic system 1 also facilitates the assembly operations with respect to systems wherein the various devices are interconnected with a number of cables variable from point to point in the system.

The communication and power supply bus 18 embodies a direct communication channel between the processor 40 of a first one of the units 14-17, 20, 22, 24, 26 and the processor 40 of a second one of the units 14-17, 20, 22, 24, 26.

In particular, the communication and power supply bus 18 embodies:
  a direct communication channel between the processor 40 of the manual command management unit 14 and the processor 40 of the derailleur management unit 16,
  a direct communication channel between the processor 40 of the manual command management unit 15 and the processor 40 of the derailleur management unit 17,
  a direct communication channel between the processor 40 of the manual command management unit 14 and the processor 40 of the derailleur management unit 17,
  a direct communication channel between the processor 40 of the manual command management unit 15 and the processor 40 of the derailleur management unit 16, The bicycle electronic system 1001 shown in FIGS. 8-11 comprises a manual command management unit 1014 and a derailleur management unit 1016.

For example, the manual command and management unit 1014 is the one that is actuated with the right hand, comprising in a per se known manner a casing that is configured for being fixed at a handgrip of a bicycle handlebar, and the derailleur management unit 1016 is the one that is associated to the rear wheel.

Preferably but not necessarily, the bicycle electronic system 1 further comprises other units.

A second manual command management unit 1015 and a second derailleur management unit 1017 are thus shown, in the above example the one actuated with the left hand, comprising in a per se known manner a casing that is configured for being fixed at a handgrip of a bicycle handlebar, and the one associated with the axle of the pedal cranks, respectively.

In an alternative embodiment, there can be just the management unit of the front derailleur and the respective control, typically actuatable with the left hand.

For the sake of brevity, hereinafter reference shall be made to the case of two manual command management units 1014, 1015 and two derailleur management units 1016, 1017.

Of the other units that can be present in the system 1001, a battery unit 1012 is shown.

In other embodiments (not shown), the battery unit 1012 can be absent and replaced by a battery or accumulator that is present in at least one derailleur management unit 1016, 1017. For the sake of simplicity of the description, hereinafter reference shall be made to the battery unit 1012, but what is said can also be applied mutatis mutandis to the case in which the battery is incorporated in the derailleur management unit(s) 1016, 1017.

Figure 8:
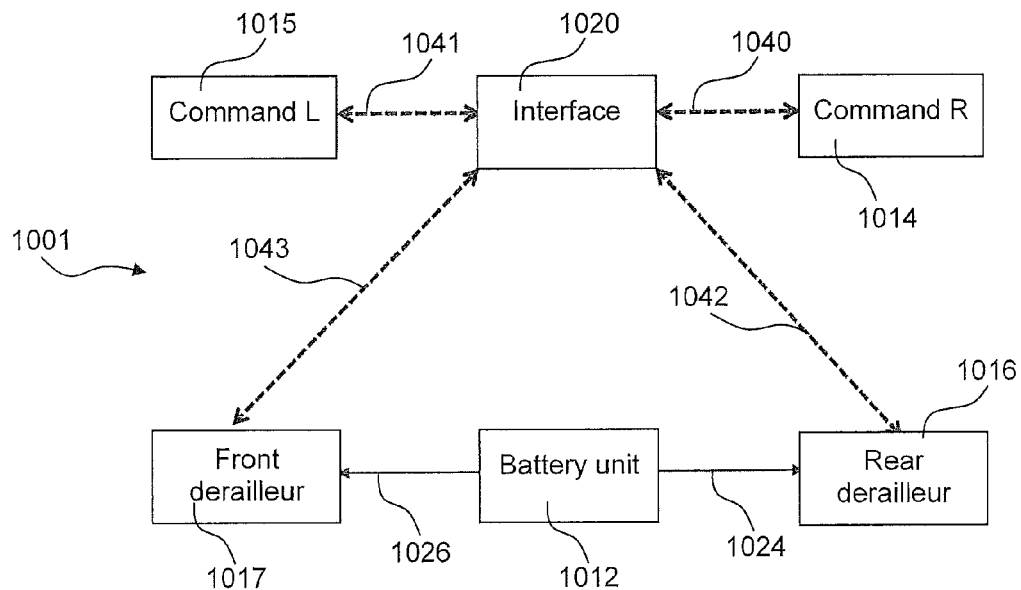
FIGS. 8-11 are block diagrams of some embodiments of a bicycle electronic system according to the present invention, which differ from one another in the architecture of a communication network within the system.
Figure 9:
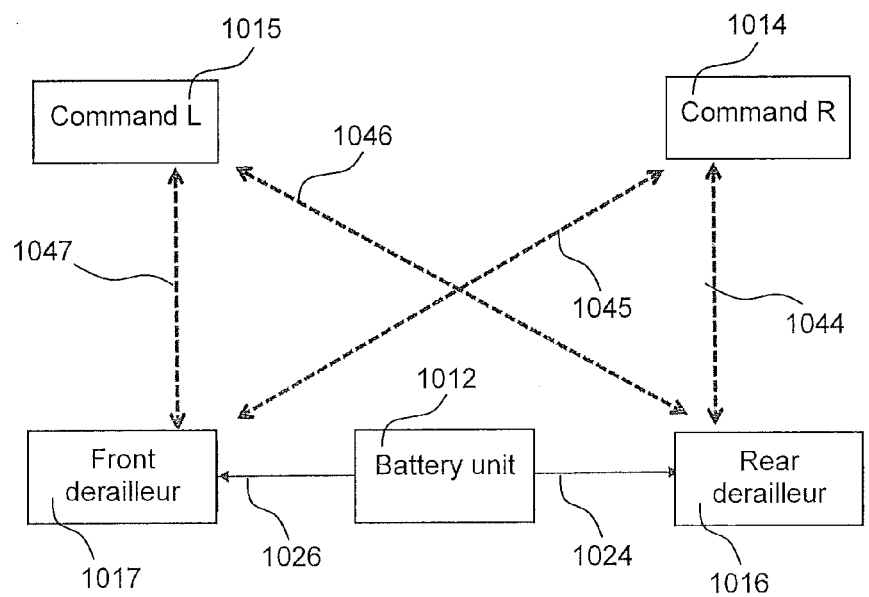
Figure 10:
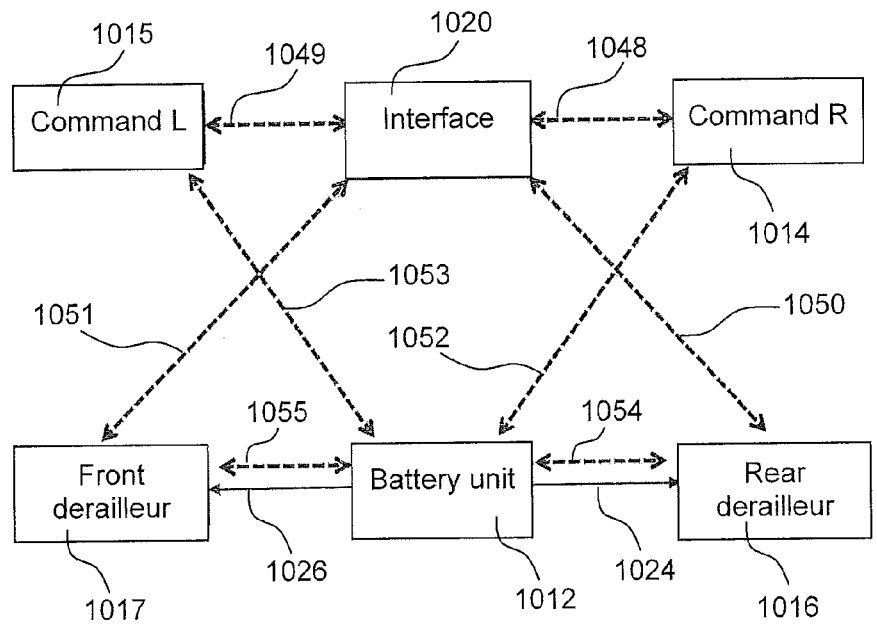
Figure 11:
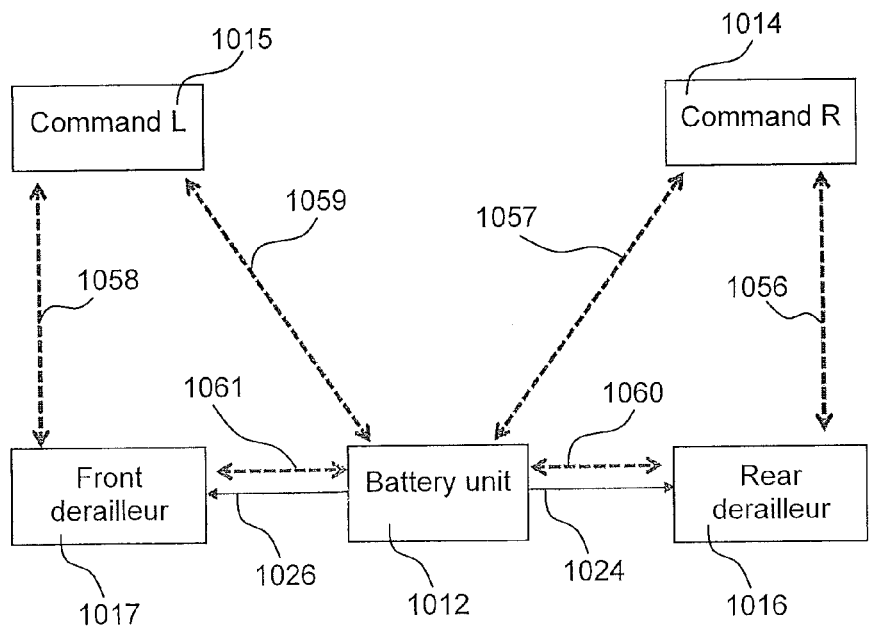

Of the other units that can be present in the bicycle electronic system 1001 there is an interface unit 1020, that is present in the embodiment of FIGS. 8 and 10 and absent in the embodiment of FIGS. 9 and 11.

The interface unit 1020, if present, can receive commands from the manual command management unit(s) 1014, 1015 and forward them to the derailleur management unit(s) 1016, 1017.

The interface unit 1020, if present, can possibly comprise a user interface including a display and/or keys, buttons, levers, a joystick or other command input members, including a touch screen.

Of the units that can be present in the bicycle electronic system 1001, but are not shown in FIGS. 8-11, are further mentioned: a battery recharger unit, that is preferably removably connected to the battery unit 1012, a sensor unit, a logging unit and a generic peripheral unit, for example a unit for detecting/processing the pedalling effort, one or more remotely-positioned command units, namely one or more duplicated command unit(s) in different positions on the handlebar or elsewhere, etc. Reference is also made to what has been described above with reference to FIG. 1.

As shall be described in greater detail hereinbelow, the various units of the bicycle electronic system 1001, except for possibly the battery unit 1012 and/or the battery recharger unit, are connected in a communication network to exchange service or error commands or messages.

The battery unit 1012 supplies the necessary power to the derailleur management units 1016, 1017.

In some embodiments, the battery unit 1012 could also supply the necessary power to the manual command management units 1014, 1015, but in a wireless manner, through radiofrequency electromagnetic field, as better illustrated hereinbelow.

In some embodiments, the battery unit 1012 could also supply the necessary power to the interface unit 1020, via cable or preferably in a wireless manner, through radiofrequency electromagnetic field, as better illustrated hereinbelow.

The battery unit 2012 comprises in a per se known manner a battery cell or battery or accumulator, which can also be formed of plural cells, preferably rechargeable ones, typically connected in series. The battery is connected between ground and power supply wires to supply a voltage difference between the two wires available for the derailleur management units 1016, 1017 through a first electric power supply connection cable 1024 and a second electric power supply connection cable 1026, respectively. The battery unit 2012 thus provides at least the energy necessary for supplying power to electric motors of the derailleur management units 1016, 1017.

If the battery unit 2012 is also connected in the communication network of the system 1001, it also comprises communication means, as shall be better illustrated hereinbelow.

The other units, in particular the manual command management unit 1014, the manual command management unit 1015, the derailleur management unit 1016, the derailleur management unit 1017 and the interface unit 1020 if present, each comprise respective communication means, as better illustrated hereinbelow.

Figure 12:
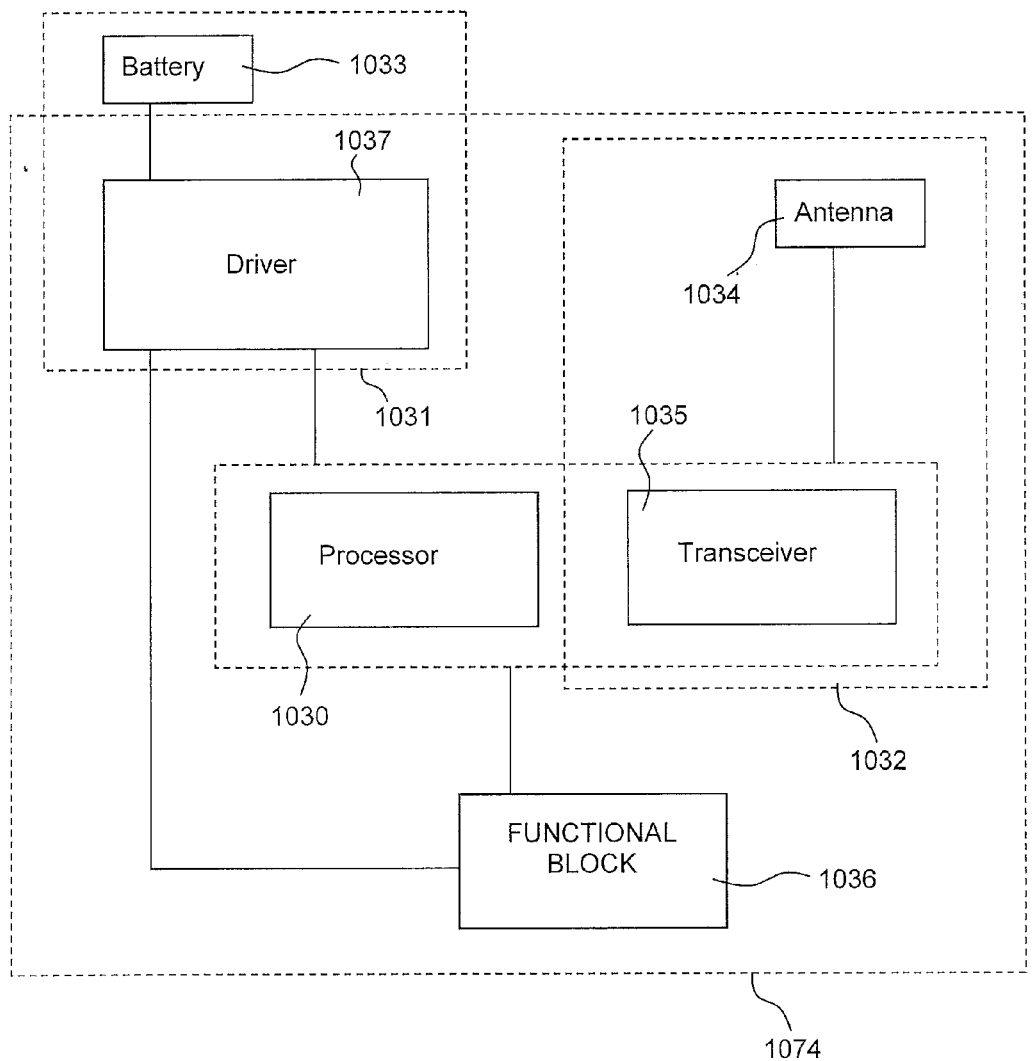
FIG. 12 is a block diagram of a unit of the bicycle electronic system of FIGS. 8-11, in one embodiment.
Figure 13:
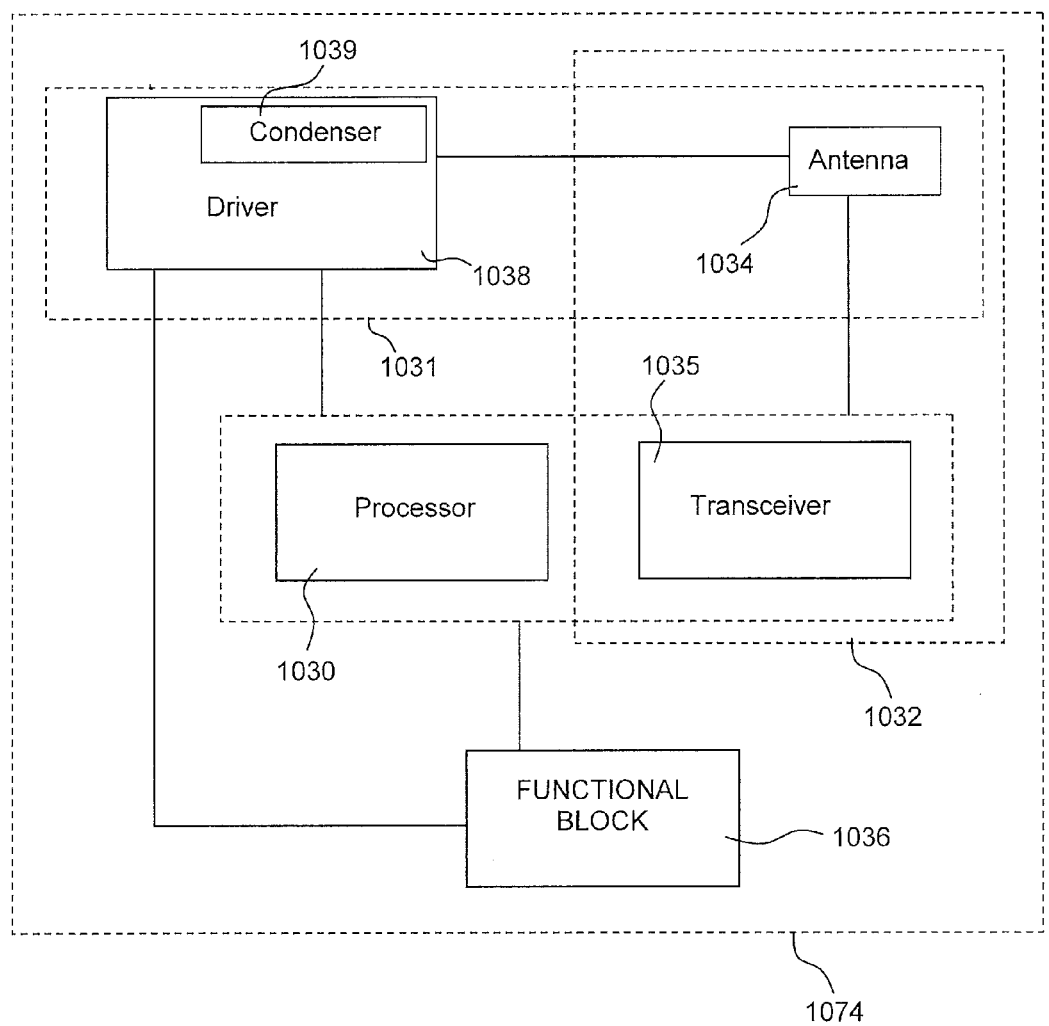
FIG. 13 is a block diagram of a unit of the bicycle electronic system of FIGS. 8-11, in another embodiment, FIG. 14 schematically represents various units of an embodiment of a bicycle electronic system, that are spread on a bicycle, FIG. 15 schematically represents a manual command management unit of an embodiment of the bicycle electronic system, FIG. 16 schematically represents an interface unit of an embodiment of the bicycle electronic system.

More in detail, reference is made to FIGS. 12 and 13, illustrating the general block diagram representative of each of the aforementioned units 1012, 1014-1017, 1020, in two embodiments. As detailed hereinbelow, not all the units of the system 1001 comprise all of the blocks indicated in FIGS. 12, 13, respectively.

Each unit 1014-1017, 1020 comprises a processor 1030, preferably a microcontroller. In the battery unit 1012, the processor 1030 may be absent.

Each of the manual command management units 1014, 1015 and the interface unit 1020 where present comprises a wireless communication device 1032. The wireless communication device 1032 comprises an antenna 1034 and a transceiver 1035 as shown. In the manual command management units 1014, 1015 the transceiver 1035 can be replaced by a transmitter.

Also each of the derailleur management units 1016, 1017 preferably comprises the wireless communication device 1032, preferably comprising the transceiver 1035 and the antenna 1034. In the derailleur management units 1016, 1017, the transceiver 1035 can be replaced by a receiver.

Also the battery unit 1012 can comprise the wireless communication device 1032, preferably comprising the transceiver 1035 and the antenna 1034.

As an alternative or in addition to the wireless communication device 1032, in the battery unit 1012, in the interface unit 1020 where present and/or in the derailleur management units 1016, 1017, the communication of data/commands can occur via cable, managed by the processor 1030. For example, the communication via cable can occur according to the modalities described above with reference to FIGS. 1-7.

In particular the communication of data/commands between the battery unit 1012 and the derailleur management units 1016, 1017 preferably occurs through the connection cables 1024, 1026, respectively.

Although not shown, there can also be a cable for power supply connection and possibly for data/command connection between the interface unit 1020 and the battery unit 1012.

In other words, in the derailleur management units 1016, 1017, in the interface unit 1020 and/or in the battery unit 1012 the communication can take place both via cable and wireless.

On the other hand, the manual command management units 1014, 1015 have just the wireless communication device 1032 and do not have cables for data/command connection or for power supply connection with the rest of the system 1001. Where present, the transceiver 1035 can be a separate component from the processor 1030 or it can be embodied directly in the processor 1030, as schematized by the dashed line.

The antenna 1034 can be a discrete component, but preferably it is made as a track on a printed circuit board carrying the processor 1030.

The processor 1030 controls and/or is controlled by specific devices for the unit 1012, 1014-1017, 1020 itself, depicted by a generic functional block 1036. For example, in the case of the manual command management unit 1014, 1015 the functional block 1036 typically comprises at least one or two switches to transmit, upon their change of state, an upward gearshifting request command and/or a downward gearshifting request command, respectively, as well as possibly levers or buttons for actuating the switches; in the case of the derailleur management unit 1016, 1017, the functional block 1036 comprises for example a driving circuit of an electric motor and/or an electric motor for moving the chain guide element of the derailleur; in the case of the interface unit 1020, the functional block 1036 comprises for example a data and program memory and possibly a display and/or control switches; in the case of the battery unit 1012, the functional block 1036 typically comprises the battery or accumulator.

Of particular interest, in the manual command management unit 1014, 1015, the processor 1030, in response to the manual actuation of a switch of its functional block 1036, emits a derailleur command; and the processor 1030 of the derailleur management unit 1016 and/or 1017 receives and processes the derailleur command through the driving circuit of the electric motor provided in the functional block 1036 of the derailleur management unit 1016 and/or 1017.

As far as the other possible units of the system 1001, not depicted, are concerned: in the case of the sensor unit, the functional block 1036 comprises one or more sensors of variables such as travel speed, the cadence of rotation of the pedal cranks, the torque applied to the pedal cranks, the slope of the travel terrain, the heart rate of the cyclist and similar; in the case of the logging unit, the functional block 1036 comprises for example a clock and a memory to store events and the respective times when they occur; finally, in the case of a generic peripheral unit, the functional block 1036 comprises one or more electronic devices controlled by or for controlling the processor 1030; there could be peripheral units having only a processing function, without the functional block 1036.

The manual command management units 1014, 1015 and preferably also the interface unit 1020, further comprise a power supply circuit 1031 for the processor 1030 and for the wireless communication device 1032.

In embodiments, as shown in FIG. 12, the power supply circuit 1031 comprises a battery power supply source 1033 and a driver 1037 suitable for supplying the processor 1030 and the wireless communication device 1032 with the voltage generated by the battery power supply source 1033. The battery power supply source is preferably a battery of the button cell type, but it could comprise one or more cylindrical cells or prismatic cells.

The battery power supply source 1033 is sufficient to supply not only the processor 1030 and the communication device 1032, rather also the functional block 1036, which in the case of the manual command management units 1014, 1015 simply comprises one or more manually actuated switches. Also in the case of the interface unit 1020, where present, a battery power supply source is in general sufficient to supply the functional block 1036 even in the case of a small display.

In embodiments, as shown in FIG. 13, the power supply circuit 1031 of the manual command management units 1014, 1015 is configured to absorb energy from a radiofrequency electromagnetic field generated within the system 1001, preferably in the interface unit 1020.

The radiofrequency power supply circuit 1031 exploits in particular RFID (Radio Frequency IDentification) technology, which is per se well known and therefore is not described in detail. FIG. 13 shows a driver 1038 connected to the antenna 1034 to absorb energy from the electromagnetic field, but alternatively there can be a second antenna, dedicated to such a function.

In a preferred embodiment, the radiofrequency power supply circuit 1031 (FIG. 13) of the manual command management units 1014, 1015 further comprises an energy accumulation device, preferably an accumulation condenser 1039. Through such an energy accumulation device 1039, the manual command management unit 1014, 1015 is able to self-power its processor 1030 for a length of time sufficient to transmit a request for emission of radiofrequency electromagnetic field to the component of the system 1001 that generates it, in particular the interface unit 1020.

Such an energy accumulation device, preferably an accumulation condenser, can also be present in the case of a battery power supply circuit 1031 (not shown in FIG. 12).

In the case of the interface unit 1020, where present, the battery power supply source 1033 is therefore preferably sufficient to also power the components of the manual command management units 1014, 1015, through the generation of a radiofrequency electromagnetic field. Its antenna 1034 is also configured to emit such a radiofrequency electromagnetic field.

The radiofrequency electromagnetic field could also be generated in the battery unit 1012. In this case, the radiofrequency electromagnetic field generated in the battery unit 1012 could also be used to supply the components of the interface unit 1020 that would then comprise a radiofrequency power supply circuit 1037 of the type shown in FIG. 13.

The provision of a wireless communication device 1032 or of cabled communication means in each unit (possibly apart from the battery unit 1012) connected in the bicycle electronic system 1001 allows the communication of data and/or commands among the various units. In particular, the manual command management unit 1014, 1015 and/or the sensor unit where provided for can communicate with the derailleur management units 1016, 1017 to impart upward and downward gearshifting commands and receive status messages of the derailleurs. A communication protocol particularly suitable for wireless communication within the bicycle electronic system 1001 is illustrated hereinafter.

As stated above, in some units the transmitter function and/or the receiver function could be absent, of course giving up the ability to communicate (or the full ability) for such units and possibly changing the communication protocol with respect to the one described hereinafter.

According to the diagram of FIG. 8, the wireless communication of data/commands within the system 1001 is carried out through a network configured like a star or a tree, with the interface unit 1020 acting as root or star centre node and communicating with the manual command management unit 1014, the manual command management unit 1015, the derailleur management unit 1016, the derailleur management unit 1017, which act as peripheral nodes, respectively, through wireless communication channels 1040, 1041, 1042, 1043.

The battery unit 1012 is not connected within the communication network or it is connected within the communication network through cabled communications with the derailleur management units 1016, 1017 via the cables 1024, 1026 provided for the power supply connection.

As stated, there can also be a cable for power supply connection and possibly for data/command connection between the interface unit 1020 and the battery unit 1012 (not shown).

The derailleur management units 1016, 1017 can possibly communicate with one another through the interface unit 1020 and/or through the battery unit 1012.

According to the diagram of FIG. 9, the wireless communication of data/commands within the system 1001 is carried out through a mesh network, with the manual command management unit 1014 communicating with the derailleur management unit 1016 and the derailleur management unit 1017, respectively, through wireless communication channels 1044, 1045; and with the manual command management unit 1015 communicating with the derailleur management unit 1016 and the derailleur management unit 1017, respectively, through communication channels 1046, 1047. Each unit 1014-1017 therefore represents a node that acts as receiver and/or transmitter and/or repeater and the interface unit 1020 is absent.

Also in this case, the battery unit 1012 is not connected within the communication network or it is connected within the communication network through cabled communications with the derailleur units 1016, 1017 via the cables 1024, 1026 provided for the power supply connection.

According to the diagram of FIG. 10, the wireless communication of data/commands within the system 1001 is carried out through a mesh network, with the interface unit 1020 communicating with the manual command management unit 1014, the manual command management unit 1015, the derailleur management unit 1016 and the derailleur management unit 1017, respectively, through wireless communication channels 1048, 1049, 1050, 1051; and with the battery unit 1012 communicating with the manual command management unit 1014, the manual command management unit 1015, the derailleur management unit 1016 and the derailleur management unit 1017, respectively, through wireless communication channels 1052, 1053, 1054, 1055.

Alternatively, the wireless communication channels 1054, 1055 can be absent and the communication between the derailleur management unit 1016 and the derailleur management unit 1017 and the battery unit 1012 can take place through the connection cables 1024, 1026, respectively.

As stated, there can also be a cable for power supply connection and possibly for data/command connection between the interface unit 1020 and the battery unit 1012 (not shown).

Also in this case the derailleur management units 1016, 1017 can possibly communicate with each other through the interface unit 1020 and/or through the battery unit 1012.

According to the diagram of FIG. 11, the wireless communication of data/commands within the system 1001 is carried out through a mesh network, with the manual command management unit 1014 communicating with the derailleur management unit 1016 and the battery unit 1012, respectively, through wireless communication channels 1056, 1057; with the manual command management unit 1015 communicating with the derailleur management unit 1017 and the battery unit 1012, respectively, through communication channels 1058, 1059; and with the battery unit 1012 communicating with the derailleur management unit 1016 and with the derailleur management unit 1017, respectively, through communication channels 1060, 1061. Each unit 1014-1017, 1012 therefore represents a node that acts as receiver and/or transmitter and/or repeater.

Alternatively, the wireless communication channels 1060, 1061 can be absent and the communication between the derailleur management unit 1016 and the derailleur management unit 1017 and the battery unit 1012 can take place through the connection cables 1024, 1026, respectively.

It should be noted that the bicycle electronic system 1001 depicted in FIGS. 9 and 11 has a distributed architecture, wherein an interface unit 1020 and a central processing unit is advantageously absent. All of the units 1014-1017, and 1012 in FIGS. 9 and 11, are of the same level, none is slave or master of others.

Those skilled in the art will understand that other diagrams or architectures of communication network among the units of the system 1001 are possible.

The bicycle electronic system 1001 described above can easily be reconfigured with the addition, removal or replacement of units, for example those described above, in the various network configurations described above or in variants thereof. The power supply connection of such additional units can take place via cable or via radiofrequency electromagnetic field, and the connection within communication network can take place via cable or wireless, as will be understood by those skilled in the art based on the above teachings.

In the bicycle electronic system 1001 it is possible to insert even more units (and in particular ZigBee End Devices, see later), intended for example for: measurement of GPS position, altimetry, temperature, detection of the physical state of the cyclist, power developed by the cyclist, battery charge, etc.

Figure 14:
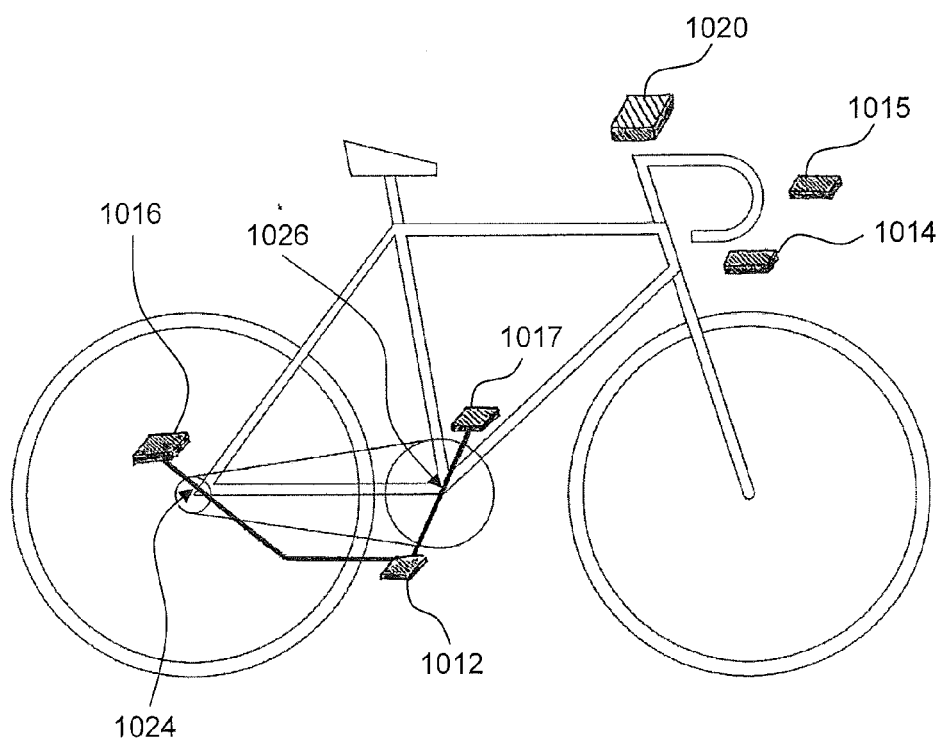

As schematically depicted in FIG. 14, each unit 1012, 1014-1017, 1020 is enclosed by its own casing, preferably by a water-tight casing, more preferably meeting at least standard IP67.

Hereinafter, the configuration of the various units 1012, 1014-1017, 1020 of the system 1001 is summarized, according to some preferred embodiments.

Each of the manual command management units 1014, 1015 is an independent or self-standing or "total wireless" unit, in the sense that it does not have cabled connections for the power supply (exploiting the possibility of being powered by radiofrequency by the power supply circuit 1031 of FIG. 13 or having its own battery power supply circuit 1031 of FIG. 12); it also lacks cabled communications for communication (transmission and optionally reception).

Figure 15:
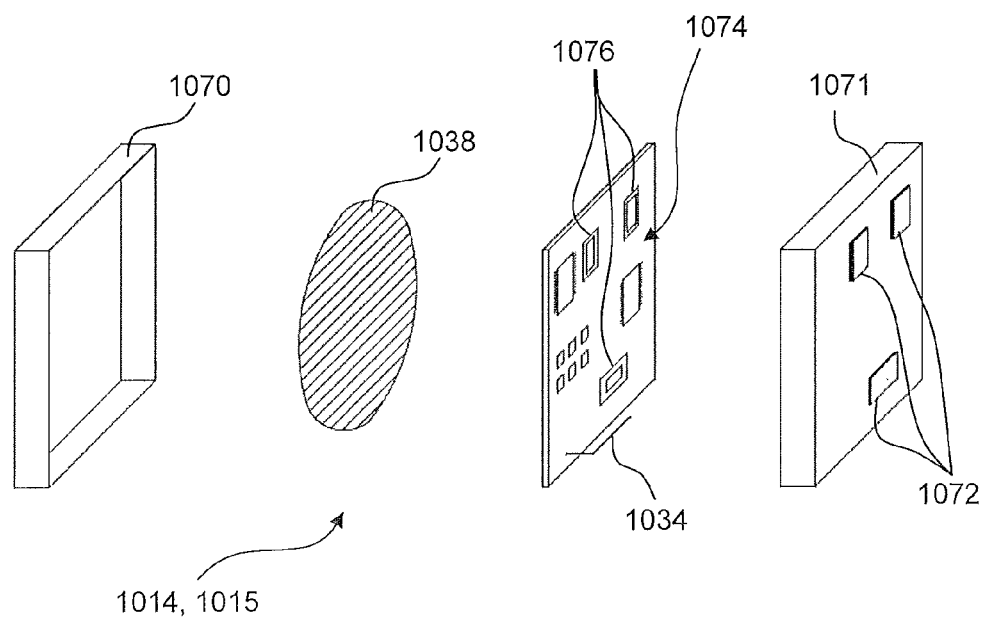

As better illustrated in FIG. 15, in the casing of each of the manual command management units 1014, 1015—made up of two half-shells 1070, 1071 and configured in a per se known way (the depiction of FIG. 15 is totally schematic) for fixing at a handgrip of a bicycle handlebar—there are:
  one or more buttons 1072 or levers or similar elements for actuating user interface switches for manually sending the desired commands, suitably integrated in the wall of the casing or projecting therefrom;
  the battery 1033 of the power supply circuit 1031 if of the battery type (FIG. 12), absent in the case of a radiofrequency power supply circuit 1031 (FIG. 13);
  a wireless electronic board or printed circuit board 1074, comprising (not all of the components are highlighted in FIG. 15 for the sake of clarity):
    the driver 1037 or 1038 of the power supply circuit 1031,
    a communication antenna 1034, possibly also part of the radiofrequency power supply circuit 1031 (FIG. 13),
    the aforementioned one or more user interface switches 1076, preferably a switch to impart an "up" command, a switch to impart a "down" command, a switch to impart a "mode" command, in a manner per se well known way in the field (functional block 1036),
    a transceiver 1035 for sending and receiving data via radiofrequency,
    a microprocessor 1030 for controlling the functions of the aforementioned components, preferably, the energy accumulation and management condenser 1039 in the case of a radiofrequency power supply circuit 1031 (FIG. 13).

The interface unit 1020, where present, is preferably an independent or self-standing or "total wireless" unit, in the sense that it does not have cabled connections for the power supply; it also preferably does not have cabled connections for communication (transmission and optionally reception).

Figure 16:
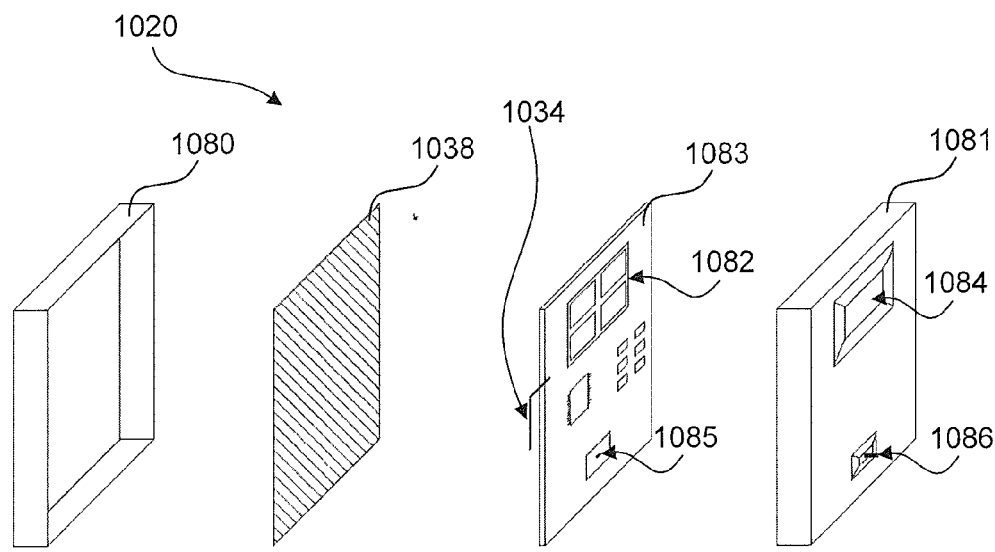

As better illustrated in FIG. 16, in the casing of the interface unit 1020—made up of two half-shells 1080, 1081 (the depiction of FIG. 15 is totally schematic)—there are:

a possible display 1082, possibly of the touch-screen type—in FIG. 16 the display 1082 is illustrated on a printed circuit board 1083 and, at the display 1082, there is a hole or transparent window 1084 in the half-shell 1081;

possible buttons or levers or similar elements, for example a joystick 1085, for activating user interface switches for manually sending the desired commands, suitably integrated in the wall of the casing or projecting therefrom (in FIG. 16 a hole is illustrated with joystick cover 1086 projecting from the half-shell 1081);

the battery 1033 of the power supply circuit 1031 if of the battery type (FIG. 12), absent in the case of a radiofrequency power supply circuit 1031 (FIG. 13) and/or if the interface unit 1020 is connected via cable with the battery unit 1012 as stated above;

the aforementioned wireless electronic board or printed circuit board 1083, comprising (not all the components are highlighted in FIG. 16 for the sake of clarity):
  the driver 1037 or 1038 of the power supply circuit 1031,
  a communication antenna 1034, possibly also part of the radiofrequency power supply circuit 1031 (FIG. 13) if the interface unit 1020 is powered by radiofrequency by the battery unit 1012; if, on the other hand, the interface unit 1020 powers by radiofrequency the manual command management units 1014, 1015, then the communication antenna 1034 is suitable for generating and propagating a suitable radiofrequency electromagnetic field,
  the aforementioned user interface switches, preferably five switches controlled by the aforementioned joystick 1085 to impart an "up" command, a "down" command, a "right" command, a "left" command and an "enter"/"mode" command of a graphical user interface (GUI) embodied by the aforementioned display 1082, or switches of a keypad or keyboard with buttons dedicated to various functions (functional block 1036),
  a transceiver 1035 for sending and receiving data via radiofrequency,
  a microprocessor 1030 for controlling the functions of the aforementioned components and for interfacing with/managing the microprocessor 1030 of the manual command management units 1014, 1015. In particular, the microprocessor 1030 of the interface unit 1020 acts as a root node or star centre node for the wireless communication network embodied in the system 1001 (FIG. 8, 10). The microprocessor 1030 can also have the functionality of cabled communication with the battery unit 1012, if such a connection cable is present.

Each of the derailleur management units 1016, 1017 can be (FIG. 10, 11) a semi-independent or "partial wireless" unit, in the sense that it does not have cabled connections for communication (transmission and optionally reception), but it has the aforementioned cabled connections 1024, 1026 with the battery unit 1012 for the power supply. In the embodiments of FIGS. 8 and 9, the connection for the communication of data/commands between each of the derailleur management units 1016, 1017 and the battery unit 1012 also takes place via cable, but such derailleur management units 1016, 1017 do not have connections for the communication of data/commands with the manual command management units 1014, 1015.

In the casing of each of the derailleur management units 1016, 1017 there are:
  a chain guide element or cage and an electromechanical actuator to move the chain guide element;
  a wireless electronic board, comprising:
    a communication antenna 1034,
    a transceiver 1035 for sending and receiving data via radiofrequency,
    a power circuit for commanding the actuator (functional block 1036),
    a microprocessor 1030 for controlling the functions of the aforementioned components. The microprocessor 1030 can also have the functionality of communication via cable with the battery unit 1012.

The battery unit 1012 can be (FIG. 10, 11) a semi-independent or "partial wireless" unit, in the sense that it does not have cabled connections for communication (transmission and optionally reception), but it has the aforementioned cabled connections 1024, 1026 with the derailleur management units 1016, 1017 for supplying them with power. In the embodiments of FIGS. 8 and 9, the connection for the communication of data/commands between the battery unit 1012 and each of the derailleur management units 1016, 1017 also takes place via cable, but such a battery unit 1012 does not have connections for the communication of data/commands with the manual command management units 1014, 1015.

In the casing of the battery unit 1012 there are:
  a power battery, preferably a lithium-ion polymer battery;
  optionally, a wireless electronic board, comprising:
    a communication antenna 1034, possibly suitable for generating and propagating a suitable radiofrequency electromagnetic field, in case it is the battery unit 1012 that supplies the interface unit 1020 and the manual command management units 1014, 1015 with power,
    a transceiver 1035 for sending and receiving data via radiofrequency,
    a microprocessor 1030 for controlling the functions of the aforementioned components.

The communication of commands from the manual command management units 1014, 1015 to the derailleur management units 1016, 1017 preferably takes place according to the following steps, under the assumption that there is an interface unit 1020 (FIGS. 8, 10) and that it is the latter that supplies the manual command management units 1014, 1015 with power by radiofrequency electromagnetic field—the changes in the other cases being within the capabilities of one skilled in the art in light of the present description:

a) pressing a button 1072 in a manual command management unit 1014, 1015 by the cyclist, b) waking up the processor 1030 in the manual command management unit 1014, 1015 from a sleep or stand-by state, said waking being possible thanks to the energy accumulated in the aforementioned energy accumulation device 1039, where provided for c) transmitting a wakening command from the manual command management unit 1014, 1015 to the interface unit 1020, d) waking up the interface unit 1020, which immediately sends energy to the manual command management unit(s) 1014, 1015, e) communicating the usual data/commands traffic between the manual command management unit(s) 1014, 1015 and interface unit 1020, possible since, thanks to step d), the manual command management unit(s) 1014, 1015 has/have sufficient energy, f) at the end of the communication or data/commands traffic, the interface unit 1020 sends energy and puts the manual command management units 1014, 1015 to sleep or stand-by, until they are awoken again, g) the interface unit 1020 in turn goes to sleep or stand-by, until it is awoken again.

Preferably, moreover:

h) if an interaction event takes place between the cyclist and the interface unit 1020, one goes to step d); and/or if no interaction event takes place between the cyclist and the manual command management unit 1014, 1015 or the interface unit 1020:

the interface unit 1020 wakes up at a predetermined frequency, it checks its operating state, and, if it does not have outstanding operations carry out, it sends energy to the manual command management unit(s) 1014, 1015 and then goes back to sleep.

As described in the introductory part, preferably the wireless communication takes place in accordance with a low power wireless communication protocol selected from ZigBee, Blue tooth, BlueTooth Low Power consumption, NFC, WiFi, RFID, more preferably in accordance with the protocol known as ZigBee.

ZigBee protocol, based on the standard IEEE 802.15.4, can in particular work at the frequency of 868 MHz or 2.4 GHz. It is based on hardware that allows a branched architecture to be implemented wherein the outer elements are called leaves or peripheral nodes (ZED—ZigBee End Device), while the elements with a function of management of the system for transmitting network organization packets are called coordinators (ZC—ZigBee Coordinator), which thus perform the function both of leaf and of manager. There can also be intermediate nodes (ZR—ZigBee Router) that perform the function of intermediate routers, passing the data from and towards other devices to optimize the routing of the signals.

In particular, in the architectures of FIGS. 8-11 the units that have been described as peripheral nodes (units 1014-1017 in FIG. 8, units 1014-1017, in FIG. 9, units 1014-1017 in FIG. 10, units 1014, 1015 in FIG. 11) can be implemented as ZEDs, one of the units that have been described as root nodes or star centre nodes (unit 1020 in FIG. 8, unit 1012 in FIG. 10, unit 1016 and/or 1017 in FIG. 11) can be implemented as ZC and the other units that have been described as root nodes or star centre nodes (unit 1020 in FIG. 10, unit 1012 in FIG. 11) can be implemented as ZR. In particular, an interface unit 1020 can be made with a ZR to allow the manual command management units 1014, 1015 to send information to the derailleur management units 1016, 1017 through the interface unit 1020.

The ZigBee devices have a sufficiently low energy consumption to be able to operate for one or two years exploiting the battery incorporated in the individual nodes, for example an AAA battery.

There are many "dialects" of such ZigBee protocol introduced by Renesas Electronics Corporation, Microchip Technology, NXP and other companies, all suitable for reducing consumption.

In ZigBee protocol, in order to reduce consumption the length of the packets sent in each communication is at most 128 byte.

In the coordinator nodes ZC there are functionalities suitable for reducing the use of communication channels perturbed by other devices with the change of channel used automatically.

The footprint of the ZigBee protocol requires little programme memory and data memory, typically 16 k, 3 or 4 k of RAM and the use of a royalty free stack.

Among the ZigBee devices available on the market there are dedicated processors, of the type commercialised by NXP, and solutions with external ZigBee peripheral, of the type commercialised by Renesas Electronics Corporation and Microchip Technology, which use an external transceiver with which the processor interfaces with modem type "AT" commands.

A ZigBee wireless network can be of the "cluster" type, wherein all of the leaves must pass through a coordinator for communicating with each other.

A ZigBee wireless network can be of the "mesh" type, wherein the leaves can also communicate with each other directly without passing through the coordinator, but if and only if at the radiofrequency visibility level they can see one another, otherwise, if there are problems or interference, the communication can take place through the coordinator. The leaves in the case of a "mesh" network become coordinators, with an increase in requirements in terms of memory.

Figure 17:
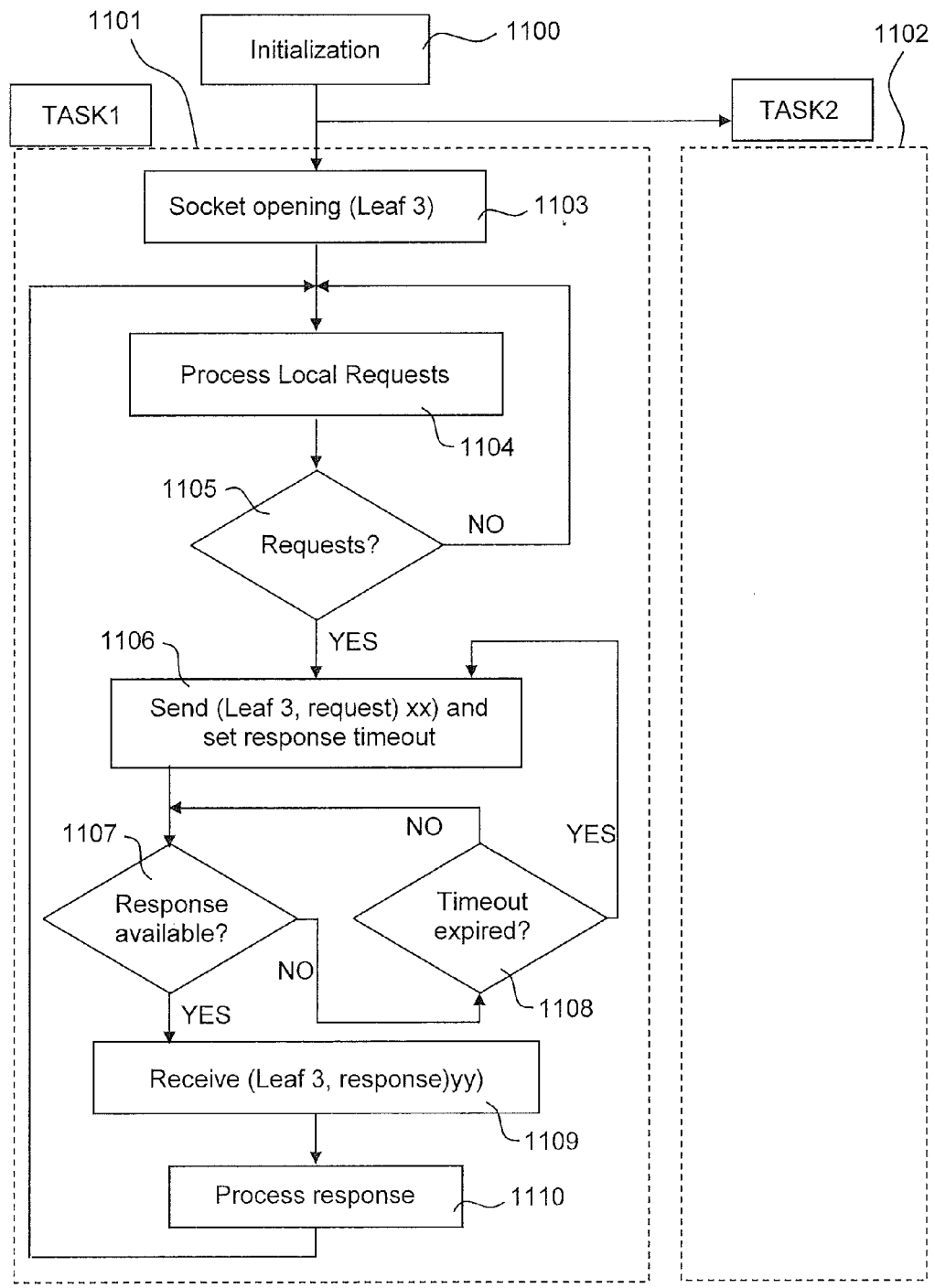
FIG. 17 is a flow chart of a communication protocol, relative to a unit acting as a peripheral node in the communication network within the system of an embodiment of the invention.
Figure 18:
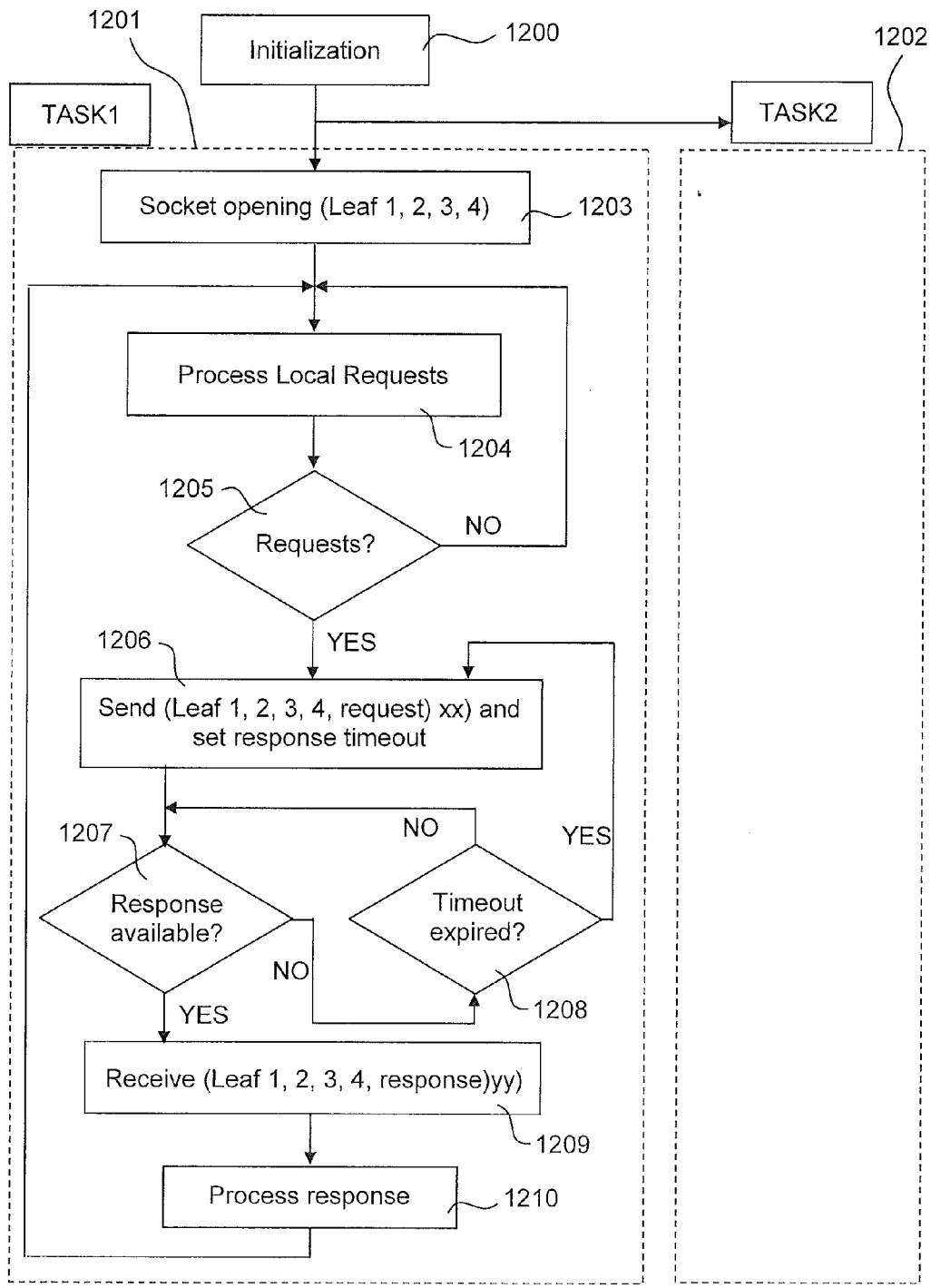
FIG. 18 is a flow chart of a communication protocol, relative to a unit acting as a root node or star centre node in the communication network within the system of an embodiment of the invention.

FIG. 17 is a flow chart of a communication protocol, relative to a unit 1012, 1014-1017, 1020 of the system 1001 that acts as a peripheral node, and in particular as a leaf or ZED—ZigBee End Device in the communication network within the system 1001, and FIG. 18 is a flow chart of a communication protocol, relative to a unit that acts as a root node or star centre node in the communication network within the system, and in particular as a ZC—ZigBee Coordinator or as a ZR—ZigBee Router.

The possible changes to be made to the flow charts described above in the case of communication protocols different from ZigBee are within the capabilities of one skilled in the art.

With reference to FIG. 17, in a block 1100 the initialisation of the unit 1012, 1014-1017, 1020 takes place.

Reference numerals 1101 and 1102 indicate task blocks. Task 1, and Task 2 are tasks that can be extended to a whole number corresponding to the maximum number of Tasks that the peripheral node unit that established the communication is able to simultaneously manage.

For example, in the case of a unit indicated as Leaf1, the latter with Task1 can communicate with a unit indicated as Leaf3, with Task 2 it can communicate with a unit indicated as Leaf4, with a Task 3 (not shown) it can communicate with a coordinator unit etc.

Each task comprises the execution of a communication according to the following sequence of operations.

In a block 1103 a socket is opened with a preselected leaf, Leaf3 in the case illustrated. The socket can be considered a gate, which one choose to open towards the desired device, which the Zig Bee stack manages. At the application software level, the socket allows receive( )—in other words generic receiving—or send (addressee, request) to the unit connected through the socket operations to be carried out.

In a block 1104, local requests are processed—for example, it is checked whether a button 1072 of the manual command management unit 1014, 1015 has been actuated by the cyclist.

In a block 1105 it is checked whether there are requests for the leaf with which the task is being carried out, namely the leaf with which the socket is opened.

In the negative case, block 1104 is returned to. In the affirmative case, one goes on to a block 1106.

In block 1106 the request is sent to the leaf with which the task is being carried out, namely the leaf with which the socket is opened, and preferably a maximum time within which a response must be received from such a leaf is set, indicated as response timeout. The maximum time is set and its passing is overseen by a suitable time-counter function, which exploits for example a clock signal inside the processor 1030.

In a block 1107 it is checked whether the response is available. In the negative case, in a block 1108 it is checked whether the time set as timeout has passed or lapsed. In the negative case, execution of checking block 1107 is returned to, while in the affirmative case, namely if the timeout has lapsed, execution of block 1106 of sending a request is returned to. Therefore, the request is sent plural times, at the frequency set by the timeout, until a response comes back.

When the response is available, affirmative outcome of block 1107, in a block 1109 the response of the leaf with which the task is being carried out, namely the leaf with which the socket is opened (Leaf 3 in the illustrated case) is received and possibly decoded.

In a block 1110 the response is then processed and to execution of block 1104 of processing local requests is returned to.

It can be provided to receive requests from other units and/or to send a confirmation of action carried out (not shown).

The communication protocol relative to a unit that acts as a root node or star centre node in the communication network within the system, and in particular as ZC—ZigBee Coordinator or as ZR—ZigBee Router illustrated in FIG. 18 is advantageously very similar to what has just been described. For this reason, the respective blocks are indicated with similar reference numerals, increased by 100 and for the sake of brevity they will not be described in detail.

The protocol of FIG. 18 differs from that of FIG. 17 in that in block 1203 the socket can be open not only with one unit or leaf, but also simultaneously with plural units or leaves, with Leaf1, Leaf2, Leaf31 , Leaf4 in the depicted example. The root or star centre unit or coordinator, unlike the leaves, can send commands/information broadcast, i.e. to all the leaves connected thereto. Just as an example, some of such information/commands can be briefly described as "gearshifting in progress on front and/or rear derailleur", "battery charged", "motor of the derailleur recovering position", "alarm in progress"—preferably with the specification of the type of alarm—, "battery exhausted", "entering in stand-by mode" in the case of step f) described above, etc.

Other information/commands that can be sent, on the other hand, to a single leaf can be briefly described as "confirmation of successful gearshifting of front/rear derailleur", "battery charge level", "position/speed/direction of movement of derailleur", "sleep condition", "alarm management condition", etc.

Accordingly, in block 1206 the request is sent to all of such units, with a broadcast transmission, in block 1207 it is checked whether all of the responses are available, in block 1209 one proceeds to receiving all of the responses and in block 1210 one proceeds to process all of the responses.

Figure 19:
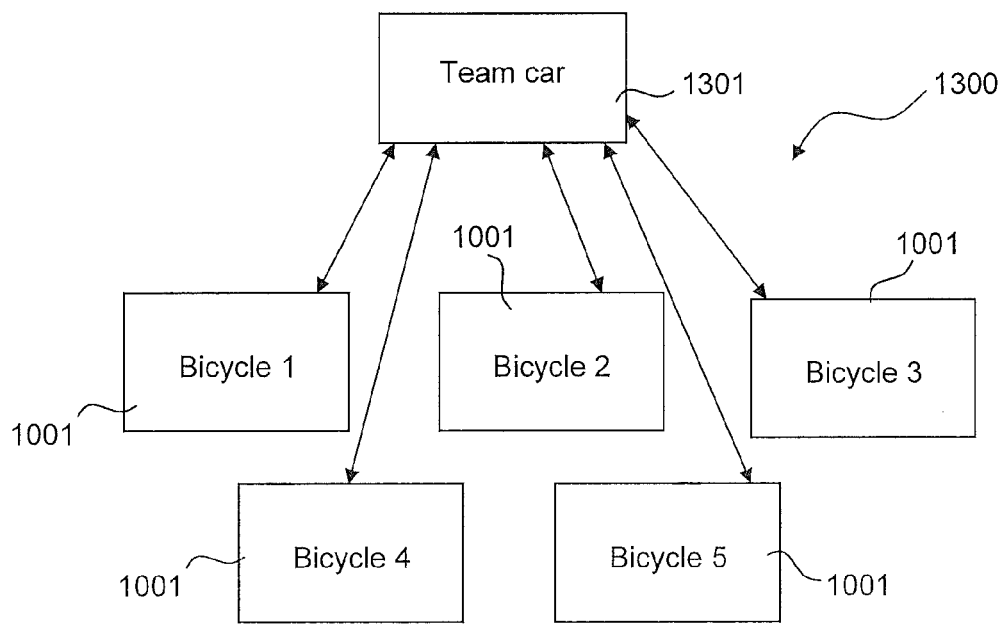
FIG. 19 is a block diagram of a control system of bicycles according to the invention.

FIG. 19 schematically illustrates a system 1300 for controlling at least one bicycle according to the invention.

The control system 1300 comprises at least one bicycle electronic system 1001 as described above, mounted on board a bicycle, and a supervisor device 1301 not mounted on board bicycles, in wireless communication with each other.

Preferably, the control system 1300 comprises a plurality of bicycle electronic systems 1001 as described above, each mounted on board a respective bicycle. FIG. 19 shows, by way of an example, five bicycle electronic systems 1001 mounted on board five bicycles. For the sake of brevity sometimes reference is made hereinafter to the bicycle to refer to the respective on board system.

Preferably, the supervisor device 1301 is on board a so-called team car, which follows a bicycle or a team of bicycles during a race. On board the team car there is the team manager.

Through the wireless communication, as described in the introductory part the current value of one or more parameters and/or variables of the systems 1001 on board one or more bicycles can advantageously be transmitted to the supervisor device 1301 and/or the value of one or more parameters and variables of the systems 1001 on board one or more bicycles can be changed by the supervisor device 1301, with a direct communication from the supervisor device 1301 to the system 1001 on board a bicycle and/or with a broadcast communication by the supervisor device 1301 addressed to all of the on board systems 1001 of the bicycles of the team.

In greater detail, the wireless—and in particular ZigBee— network of the control system 1300 consists of a certain number of electronic systems 1001 on board one or more bicycles, within each of which a wireless subnetwork is implemented, each with its own coordinator ZC (ZigBee Coordinator), which will internally consist of ZEDs (ZigBee End Devices) and possibly ZRs (ZigBee Routers).

The coordinator ZC of the subnetwork implemented in the system 1001 of each bicycle also has the function of a gateway between the systems 1001 of the various bicycles and with another coordinator ZC present in the supervisor device 1301 on the team car.

The coordinator ZC present in the supervisor device 1301 on the team car, through specific software, allows some operations to be defined: monitoring the state of bicycles, parameterization of one or of the bicycles based on the requirements of the current racing route, diagnostic request, etc.

The step of establishing the wireless network of the control system 1300 is, first of all, the creation of the network (of the cluster type) among the various coordinators ZC of the on board systems 1001 and of the supervisor device 1301, to allow the reciprocal visibility/communication, and this is allowed by the coordinator node ZC of the supervisor device 1301.

The step of establishing the physical layer of the wireless network of the control system 1300 takes place automatically by hardware settings on the ZigBee stack, preferably with suitable protections, like security keys, etc.

In establishing the physical layer, there is the definition of the presence of a unique network address for each network unit. The physical layer is used at the start of the network for synchronization, and it is transparent for the end user (the control system 1300).

Thereafter, once the physical layer has been created, the application linked to the user part starts the interrogations, as described hereinafter for some example cases.

In terms of the monitoring of one or more bicycles, it is possible for the supervisor device 1301 to carry out the request—to each bicycle or to one in particular—for the current values of one or more variables or parameters, including: the speed, the count of gearshifting actions carried out from the start of the race, the number of toothed wheel on which the chain is engaged in the front and/or rear derailleur, the firmware release of the electronic system(s) 1001 present(s) and/or of each electronic board thereof, and any other parameter relative to the configuration of the electronic system 1001 on board the bicycle(s).

As far as the diagnostic request is concerned, the supervisor device 1301 on board the team car can ask for the diagnostic data from the system 1001 on board each bicycle in order to check whether any unit should or should not be replaced, for example after the cyclist has had a crash, in order to ensure the safety of the vehicle and the desired performance.

Using a wireless and in particular ZigBee network is particularly advantageous because it allows to check the state of the electronic system 1001 on board a bicycle without the bicycle being physically visible to the team car. This is particularly important since during the race the team car is at the back of the group, while the bicycle could be sprinting ahead, hundreds of metres ahead.

The parameterization of the electronic system 1001 on board the bicycle can also be advantageously carried out remotely by the supervisor device 1300. Sometimes during a race there can be problems linked for example to failures or breaking of a derailleur; in this case it is possible to read the parameters of the bicycle and reset the factory values to try to restore the correct operation of the on board electronic system 1001, and in particular of the malfunctioning derailleur. In other cases, for example, the route is very variable and it is necessary to change the parameter of the actuation times of the motor of a derailleur, reducing it or increasing it based on the section of route reached; this can be carried out both at the level of a single bicycle or broadcast to all of the followed bicycles to make the operation faster.

From the description that has been made, the characteristics of the bicycle electronic system object of the present invention are clear, just as the relative advantages are also clear.

Further variants of the embodiments described above are possible, without departing from the teaching of the invention.

Finally, it is clear that the bicycle electronic system thus conceived is subject to undergo several modifications and variants, all encompassed by the invention; moreover, all of the details can be replaced by technically equivalent elements. In practice, the materials used, as well as the sizes, can be whatever according to the technical requirements.

The invention claimed is:

1. A bicycle electronic system comprising:
a manual command management unit having a casing configured for being fixed at a handgrip of a bicycle handlebar, comprising at least one first manually actuatable switch and a first processor,
a derailleur management unit comprising a second processor,
wherein the system comprises a first direct communication channel that connects the first processor and the second processor,
wherein the first processor, in response to the manual actuation of the at least one first switch, emits a derailleur command signal addressed to the derailleur management unit, and
the second processor receives the derailleur command signal from the first processor through the first direct communication channel.

2. Bicycle electronic system according to claim 1, further comprising a second manual command management unit having a casing configured for being fixed at a second handgrip of the bicycle handlebar, comprising at least one second manually actuatable switch and a third processor.

3. Bicycle electronic system according to claim 2, further comprising a second derailleur management unit comprising a fourth processor.

4. Bicycle electronic system according to claim 3, further comprising a second direct communication channel between the third processor and the fourth processor, and the third processor, in response to the manual actuation of the at least one second switch, emits a derailleur command signal addressed to the second derailleur management unit, and the fourth processor receives the derailleur command signal from the third processor through the second direct communication channel.

5. Bicycle electronic system according to claim 4, further comprising a third direct communication channel between the first processor and the fourth processor, and the first processor, in response to the manual actuation of the at least one first switch, emits a derailleur command signal addressed to the second derailleur management unit, and the fourth processor receives the derailleur command signal from the first processor through the third direct communication channel.

6. Bicycle electronic system according to claim 5, further comprising a fourth direct communication channel between the third processor and the second processor, and the third processor, in response to the manual actuation of the at least one second switch, emits a derailleur command signal addressed to the derailleur management unit, and the second processor receives the derailleur command signal from the third processor through the fourth direct communication channel.

7. Bicycle electronic system according to claim 6, wherein at least one of the direct communication channels is a wireless communication channel.

8. Bicycle electronic system according to claim 6, wherein at least one of the direct communication channels is a cabled communication channel.

9. Bicycle electronic system according to claim 8, wherein the first direct communication channel, the second direct communication channel, the third direct communication channel, and the fourth direct communication channel are cabled communication channels on a same communication bus.

* * * * *